US012556104B2

United States Patent
Wu et al.

(10) Patent No.: US 12,556,104 B2
(45) Date of Patent: Feb. 17, 2026

(54) DIRECT-CURRENT-TO-DIRECT-CURRENT CONVERTER FOR PARALLEL OPERATION

(71) Applicant: Deere & Company, Moline, IL (US)

(72) Inventors: Yuheng Wu, Fargo, ND (US); Tianjun Fu, West Fargo, ND (US); Long Wu, Fargo, ND (US); Dustin E. Oelmann, Fargo, ND (US); Richard E. Wainwright, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 290 days.

(21) Appl. No.: 18/360,990

(22) Filed: Jul. 28, 2023

(65) Prior Publication Data

US 2024/0204670 A1    Jun. 20, 2024

Related U.S. Application Data

(60) Provisional application No. 63/387,803, filed on Dec. 16, 2022.

(51) Int. Cl.
*H02M 3/335*     (2006.01)
*H02M 1/00*      (2007.01)

(52) U.S. Cl.
CPC ..... *H02M 3/33573* (2021.05); *H02M 1/0025* (2021.05); *H02M 1/0043* (2021.05); *H02M 3/33584* (2013.01); *H02M 3/33515* (2013.01)

(58) Field of Classification Search
CPC ............... H02M 1/0043; H02M 3/335; H02M 3/33569–33592
See application file for complete search history.

(56) References Cited

U.S. PATENT DOCUMENTS

| | | | |
|---|---|---|---|
| 9,543,842 B2 | 1/2017 | Jovcic | |
| 10,657,450 B2 | 5/2020 | Ritter et al. | |
| 11,063,435 B2 | 7/2021 | Jacobson et al. | |
| 2005/0286271 A1 | 12/2005 | Vinciarelli | |
| 2013/0201733 A1 | 8/2013 | Divan et al. | |
| 2015/0349649 A1 | 12/2015 | Zane et al. | |
| 2023/0163682 A1* | 5/2023 | Shah | H02M 3/01 363/13 |

OTHER PUBLICATIONS

Extended European Search Report and Written Opinion issued in European Patent Application No. 23205515.2 dated May 2, 2024, in 14 pages.

(Continued)

*Primary Examiner* — Fred E Finch, III

(57) ABSTRACT

A first electronic controller is configured to provide control signals to the control terminals of the semiconductor switches of the first primary converter and the first secondary converter based on a commanded current or target output current (e.g., pursuant to a voltage control mode); the first electronic controller is configured to adjust or increase the output impedance or output resistance of the first secondary converter based on a first droop compensation module (or a first parallel compensation module) responsive to a current error or current difference between the target output current and the observed output current.

7 Claims, 8 Drawing Sheets

(56) References Cited

OTHER PUBLICATIONS

Welbert et al. Voltage and Power Balance Strategy without Communication for a Modular Solid State Transformer Based on Adaptive Droop Control, Energies 11.7 (2018): 1802, Jul. 10, 2018, pp. 1-21.

Guan et al., A Series-Connected Offshore Wind Farm Based on Modular Dual-Active-Bridge (DAB) Isolated DC-DC Converter, in IEEE Transactions on Energy Conversion, vol. 34, No. 3, pp. 1422-1431, Sep. 2019, doi: 10.1109/TEC.2019.2918200.

Sun et al., A Simple Sensorless Current Sharing Control for Input-Parallel Output-Parallel Dual Active Bridge Converters, IEEE Transactions on Industrial Electronics, vol. 69, No. 11, pp. 10819-10833, Nov. 2022, doi: 10.1109/TIE.2021.3121696.

* cited by examiner

DIRECT-CURRENT-TO-DIRECT-CURRENT CONVERTER FOR PARALLEL OPERATION

RELATED APPLICATION

This document (including the drawings) claims priority and the benefit of the filing date based on U.S. provisional application No. 63/387,803, filed Dec. 16, 2022, under 35 U.S.C. § 119(e), where the provisional application is hereby incorporated by reference herein.

FIELD

The disclosure relates to a direct-current (DC)-to direct-current (DC) converter for parallel operation.

BACKGROUND

In some prior art, if multiple DC-to-DC converters are coupled in parallel to support a DC load, load current may be shared unequally or contrary to commanded power sharing between or among the DC-to-DC converters, which indicates that an unwanted circulating current can be flowing between the DC-to-DC converters. The circulating current tends to increase the power losses and decrease the efficiency of the DC-DC converter. In a possible worst case scenario, a sufficiently high circulating current can trigger overcurrent protection that switches off the DC-to-DC converters or the paralleled converter system may not be able to provide the required power to the load. Further, in some prior art, unmatched current sharing and power losses can stress different DC-to-DC converters to reduce the longevity differently between or among parallel-connected DC-to-DC converters, which in turn can reduce the reliability of using the DC-DC converters as a power source. Therefore, there is a need for a DC-to-DC converter for parallel operation.

SUMMARY

In accordance with one embodiment, a dual-active-bridge converter system comprises a first primary converter, a first transformer, a first secondary converter, and a first electronic controller. The first primary converter has a first switched terminal of low-side semiconductor switch that is coupled to a corresponding second switched terminal of high-side semiconductor switch at a first primary alternating current node. The low-side semiconductor switch has a second switched terminal that is coupled to one terminal of a first primary direct current bus. The high-side semiconductor switch has a first switched terminal that is coupled to another terminal of the first primary direct current bus.

A first secondary converter has a first switched terminal of low-side semiconductor switch that is coupled to a corresponding second switched terminal of high-side semiconductor switch at a first secondary alternating current node. The low-side semiconductor switch has a second switched terminal that is coupled to one terminal of a first secondary direct current bus. The high-side semiconductor switch has a first switched terminal coupled to another terminal of the first secondary direct current bus.

In accordance with one aspect of the disclosure, a first output voltage sensor is configured to measure a first observed output voltage the first secondary converter. A first output current sensor is configured to measure a first observed output current of the first secondary converter. A first transformer coupled between the first primary alternating current node and the first secondary alternating current node.

In accordance with another aspect of the disclosure, a first electronic controller is configured to provide control signals to the control terminals of the semiconductor switches of the first primary converter and the first secondary converter based on a commanded current or target output current (e.g., pursuant to a voltage control mode); the first electronic controller is configured to adjust or increase the output impedance or output resistance of the first secondary converter (e.g., or the first primary converter and the first secondary converter) based on a first droop compensation module (or a first parallel compensation module) responsive to a current error or current difference between the target output current and the observed output current.

DETAILED DESCRIPTION

In any of the above referenced drawings of this document, any arrow or line that connects any blocks, components, modules, multiplexers, sensors, switches, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

Figure 1A:
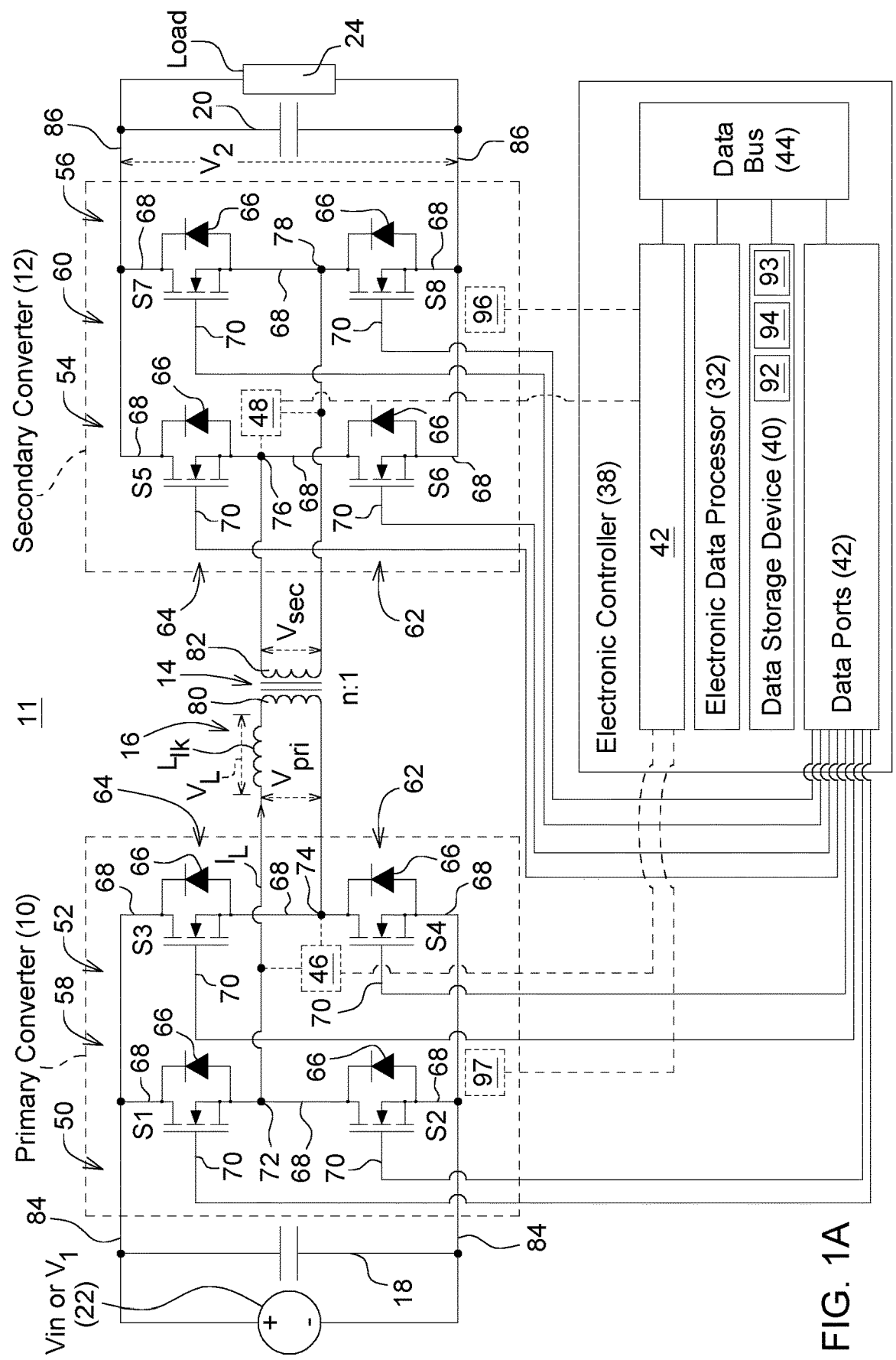
FIG. 1A is a schematic diagram of one embodiment of a direct-current-to-direct-current-converter (DC-to-DC converter or DC-DC converter) that comprises a primary full bridge converter coupled to a secondary full bridge converter via a transformer.

In accordance with one embodiment, FIG. 1A illustrates a system of controlling a direct-current (DC) to direct-current (DC) converter for improved thermal efficiency. In FIG. 1A, a primary converter 10 comprises first pair 50 of primary switches and a second pair 52 of primary switches coupled between direct current (input) primary terminals 84 of the primary converter 10. A secondary converter 12 comprises a first pair 54 of secondary switches and second pair 56 of secondary switches coupled between direct current output terminals 86 of the secondary converter. The first pair 54 of secondary switches may also be referred to as a third pair of semiconductor switches (S5, S6) within the DC-to-DC converter 11; similarly the second pair 56 of secondary switches may be referred to as a fourth pair of semiconductor switches (S7, S8) within the DC-to-DC converter 11. A transformer 14 (e.g., isolation transformer) is coupled between the primary converter 10 and the secondary converter 12. A primary winding 80 of the transformer 14 is coupled to output terminals of the first pair 50 and second pair 52 of primary switches and secondary winding 82 of the transformer 14 is coupled to output terminals of the secondary switches 60. A load 24 (e.g., direct-current load) is arranged for coupling to the direct current output terminals 86; wherein an electronic controller 38 is configured to provide time-synchronized control signals to the control terminals of the primary switches 58 and secondary switches 60 to control the converter 11 or system to operate at a modulation frequency (e.g., pulse width modulation frequency).

In one embodiment, one or more voltage measurement devices (46, 48) are configured to measure an observed input voltage and observed output voltage to determine an operational load ratio or operational load percentage between the observed power transfer and maximum power transfer. Because the measurement devices (46, 48) are optional in some configurations, the measurement devices are illustrated in dashed lines.

In one configuration, an electronic data processor 32 or electronic controller 38 is configured to select a load curve based on the determined operational load ratio or percentage. Further, the electronic data processor 32 or electronic controller 38 is configured to adjust or maintain the modulation frequency (e.g., pulse width modulation (PWM)) of the primary converter 10 and the secondary converter 12 consistent with an operation point on the selected load curve, where the operation point minimizes the power loss or thermal energy dissipated from the direct-current-to-direct current converter 11.

FIG. 1A is a schematic diagram of one embodiment of a direct-current-to-direct-current converter 11 (DC-to-DC converter) that comprises a primary full bridge 10 coupled to a secondary full bridge 12 via a transformer 14. A primary full bridge 10 comprises first pair 50 of primary switches and a second pair 52 of primary switches. The first pair 50 of primary switches is coupled between direct current (DC) primary terminals 84 (e.g., input terminals) of the primary full bridge 10; the second pair 52 of primary switches 58 is coupled between DC primary terminals 84 (e.g., input terminals) of the primary full bridge 10. The first pair 50 and second pair 52 of primary switches 58 may be referred to as an H-bridge.

In one embodiment, the DC-to-DC converter 11 comprises a single phase, dual-active bridge DC-to-DC converter with DC primary terminals 84 (e.g., DC input terminals) at the primary full bridge 10 and DC secondary terminals 86 (e.g., DC output terminals) at the secondary full bridge 12, where the DC-to-DC converter may operate unidirectionally or bidirectionally (e.g., to transfer electrical power or energy from the input to the output of the converter 11, or vice versa). Each pair of primary switches 58 comprises a low-side switch 62 and a high-side switch 64. Similarly, each pair of secondary switches 60 comprises a low-side switch 62 and a high-side switch 64. Each switch (58, 60) has switched terminals 68 that are controlled by a control terminal 70. For example, if the switch is a field effect transistor, such as a metal oxide semiconductor field effect transistor (MOSFET) (e.g., Silicon Carbide MOSFET), the switched terminals 68 comprise a source and drain terminal and the control terminal 70 comprises a gate terminal. In one configuration, for each pair of primary switches 58, the switched terminals 68 of the low-side switch 62 are coupled in series to the switched terminals 68 of the high-side switch 64 between the DC primary terminals 84. As illustrated in FIG. 1A, each switch has a protective diode 66 coupled in parallel to the switched terminals 68 of the respective switch. In one embodiment, the switches (58, 60) may comprise silicon carbide field effect transistors or other wide-band-gap semiconductor devices.

In the primary full bridge 10, the switched terminals 68 of the first pair 50 of low-side switch 62 and the high-side switch 64 are coupled together at a first node 72 or first junction associated with a primary alternating current signal. In the primary full bridge 10, the switched terminals 68 of the second pair 52 of low-side switch 62 and the high-side switch 64 are coupled together at a second node 74 or second junction associated with the primary alternating current signal.

A secondary full bridge 12 comprises a third pair (S5, S6) of switches (e.g., secondary switches 60) and a fourth pair (S7, S8) of switches (e.g., secondary switches 60) coupled between DC secondary terminals 86 (e.g., output terminals) of the secondary full bridge 12. The third pair (S5, S6) of switches (e.g., secondary switches 60) is coupled between direct current secondary terminals (e.g., output terminals) of the secondary full bridge 12; the fourth pair (S7, S8) of switches (e.g., secondary switches 60) is coupled between DC secondary terminals 86 (e.g., output terminals) of the secondary full bridge 12.

Each pair of secondary switches 60 comprises a low-side switch 62 and a high side switch 64. Each secondary switch 60 has switched terminals 68 that are controlled by a control terminal 70. For example, if the switch is a field effect transistor, such as a metal oxide semiconductor field effect transistor (MOSFET) (e.g., silicon carbide MOSFET devices), the switched terminals 68 comprise a source and drain terminal and the control terminal 70 comprises a gate terminal. As illustrated in FIG. 1A, each secondary switch 60 has a protective diode 66 coupled in parallel to the switched terminals 68 of the respective switch.

In the DC-to-DC converter 11 in one illustrative configuration, each diode 66 facilitates current dissipation associated with the respective switch (58, 60), to which the diode 66 is coupled in parallel, to reduce transient voltages across the switch (e.g., during a prior turn-off, prior deactivation or prior dead-time of the switch in preparation) for the next turning on of the switch, or next activating of the switch (58, 60). In one embodiment, the protective diodes 66 may be composed gallium nitride diodes or other semiconductor materials.

In the secondary full bridge 12, the switched terminals 68 of the third pair (S5, S6) of low-side switch 62 and the high-side switch 64 are coupled together at a third node 76 or third junction associated with a secondary alternating current signal. In the secondary full bridge 12, the switched terminals 68 of the fourth pair (S7, S8) of low-side switch 62 and the high-side switch 64 are coupled together at a fourth node 78 or fourth junction associated with the secondary alternating current signal.

In one embodiment, a transformer 14 is coupled between the primary full bridge 10 and the secondary full bridge 12. For example, a primary winding 80 of the transformer 14 is coupled to a first node 72 (e.g., first output terminal) of the first pair 50 and the second node 74 (e.g., second output terminal) of second pair 52 of primary switches 58. Similarly, a secondary winding 82 of the transformer 14 is coupled to a third node 76 (e.g., third output terminal) of the third pair (S5, S6) and a fourth node 78 (e.g., fourth output terminal) of the fourth pair (S7, S8) of switches (e.g., secondary switches 60).

The transformer 14 has at least one primary winding 80 and at least one secondary winding 82, where a transformer 14 ratio (n) represents a voltage ratio between the primary terminals and the secondary terminals, or between the primary winding and the secondary winding. For example, the primary winding 80 ratio may represent the number of relative turns (n) of the primary winding 80 to the secondary winding 82. The voltage ratio or winding ratio (turn ratio) may depend upon the winding configuration, the conductor configuration, and the configuration of any core, such as ferromagnetic core, a ferrite core, or an iron core.

In one embodiment, an inductor or variable inductor 16 is coupled in series with the primary winding 80 of the transformer. In an alternate embodiment, the variable inductor is associated with a set of discrete inductors that can be connected, via a set of switches, in series, in a parallel, or both, to achieve an adjustable aggregate inductance. For example, the controller 38 or data processor 32 can control or adjust the variable inductor, or its associated switches, to tune the transformer 14 for the target modulation frequency (e.g., of a pulse width modulation (PWM) signal) to minimize power loss, power difference or thermal dissipation of the converter 11.

As illustrated in FIG. 1A in the context of the DC-to-DC converter 11, the primary full bridge 10 establishes a primary AC waveform at the primary winding 80 of the transformer 14 and the secondary full bridge establishes a secondary AC waveform at the secondary winding 82 of the transformer 14, where the primary AC waveform and the secondary AC waveform are offset by a phase offset via control signals applied to the switches. In one embodiment, the electronic controller 38 is configured to adjust or set the phase offset to establish power transfer (e.g., bidirectional, or rather in either direction) between the primary DC bus and the secondary DC bus.

The electronic controller 38 is configured to activate and deactivate the switches in a defined sequence to produce the primary and secondary AC waveforms with an adjustable phase offset. For example, the primary full bridge the high-side primary switch S1 is generally active when low-side primary switch S4 is active; high-side primary switch S1 is generally inactive when low side primary switch S4 is inactive; low-side primary switch S2 is generally active when high-side primary switch S3 is active; low-side primary switch S2 is generally inactive when high-side primary switch S3 is inactive. Similarly, in the secondary full bridge, the high-side secondary switch S5 is generally active when low-side secondary switch S8 is active; high-side secondary switch S5 is generally inactive when low side secondary switch S8 is inactive; low-side secondary switch S6 is generally active when high-side secondary switch S7 is active; low-side secondary switch S6 is generally inactive when high-side secondary switch S7 is inactive.

An energy source 22 (e.g., battery, capacitor, or generator output) is coupled to the direct current (DC) primary terminals 84 (e.g., input terminals). A load 24 (e.g., active or passive load) is configured to be coupled to the direct current (DC) secondary terminals 86 (e.g., output terminals). However, the DC-to-DC converter 11 that comprises the primary full bridge 10, the secondary full bridge 12 and the transformer 14 can operate bi-directionally, such as where the electrical energy is transferred in either direction between the DC primary terminals 84 and the DC secondary terminals 86. In one direction, the energy source 22 at the DC primary terminals 84 can power a load 24 at the DC secondary terminals 86. However, in the opposite direction, the load 24 at the DC secondary terminals 86 can provide excess or transient energy to the DC primary terminals 84 to charge the energy source 22. As illustrated, a capacitor, such as a primary capacitor 18 is placed across the DC primary terminals 84 and a secondary capacitor 20 is placed across the DC secondary terminals 86, where the primary capacitor 18 and the secondary capacitor 20 are used for filtering (e.g., to reduce noise, such as voltage ripple in the DC voltage).

In certain embodiments, the DC primary terminals 84 are configured to operate at a different voltage level than the DC secondary terminals 86. In other embodiments, the DC primary terminals 84, the DC secondary voltage levels can have variable voltage levels that can fluctuate with the load 24 or operating conditions on a dynamic basis for each time interval (e.g., sampling time of DC voltage observed at the DC primary input and DC secondary output terminals of the converter). For example, the DC primary terminals 84 operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals 86. Accordingly, the electronic assembly or DC-to-DC converter 11 supports a vehicle with different DC bus levels that are isolated from each other because the transformer blocks DC energy from passing through between transformer primary and transformer secondary.

In one embodiment, an electronic data processor 32, such as an electronic controller 38, is configured to provide time-synchronized control signals to the control terminals 70 of the primary switches 58 and secondary switches 60 to control the converter 11 to operate efficiently in a first control mode 26, a second control mode 28, or a third control mode 30 (in FIG. 7), wherein the first control mode 26 comprises a phase-shift mode, the second control mode 28 comprises a triangular waveform control mode and wherein the third control mode 30 comprises a trapezoidal waveform control mode.

In one embodiment, an electronic controller 38 comprises an electronic data processor 32, a data storage device 40, and one or more data ports 42 coupled to or in communication with a data bus 44. The electronic data processor 32, the data storage device 40, and one or more data ports 42 may communicate data messages between each other via the data bus 44.

The electronic controller (38, 920) may store software instructions or software modules (e.g., 922) in the data storage device (40) for execution by the electronic data processor. For example, the software modules may comprise a current measurement module 92, a voltage measurement module 94, a parallel compensation module 93, and a temperature compensation module 95.

The temperature estimation module 95 may use one or more temperature sensors (96, 97) to estimate the operational temperature versus time of the primary converter 10, the secondary converter 12, or components of the primary converter 10, and the secondary converter 12, such as the semiconductor switches (S1, S2, S3, S4, S5, S6, S7, S8).

The current measurement module 92 is configured to measure, determine or estimate one or more of the following electrical properties: (a) the output current of the secondary converter 12 or output load current via a current sensor 90; the output current of the primary converter 10 to energy source 22 (e.g., battery or ultra-capacitor) via a current sensor (e.g., similar to current sensor 90 on the secondary converter); (c) the capacitor current (e.g., of the secondary capacitor 20 or primary capacitor 18); (d) alternating current ripple or alternating current components on the primary or secondary DC bus, via sensors (146, 148).

The voltage measurement module 94 is configured to measure, determine or estimate one or more of the following electrical properties: (a) DC voltage on the primary or secondary bus via sensors (146, 148) coupled to the data ports 42; (b) change in voltage per unit time across the capacitor terminals of the secondary capacitor 20 or primary capacitor 18; (c) and alternating current voltage components on the primary on the primary or secondary DC bus, via sensors (146, 148).

In any some embodiments, the current sensors (90), and voltage sensors (46, 48, 146, 148), and temperature sensors (96, 97) may be used alone or together with analog-to-digital converters to provide digital voltage output to the data ports 42.

The electronic data processor 32 comprises a microcontroller, a microprocessor, a programmable logic array, a logic device, an arithmetic logic unit, a digital signal processor, an application specific integrated circuit or another device for processing or manipulating data. The data storage device 40 comprises electronic memory, nonvolatile random-access memory, magnetic storage device, an optical storage device, or another device for storing, retrieving and managing data, files, data structures or data records. The data ports 42 may comprise an input/output port, a data transceiver, a wireline transceiver, a wireless transceiver, buffer memory, or a combination of the foregoing items.

In one embodiment, the electronic data processor 32 or its data ports 42 are connected to or in communication with the control terminals 70 of the switches (e.g., primary switches 58 and the secondary switches 60) of the primary full bridge 10 and the secondary full bridge 12. Accordingly, the electronic controller 38 can control the timing and operation of each switch, such as activation time, deactivation time, biasing and other aspects. In one embodiment, the electronic controller 38 or electronic data processor 32 uses a fixed switching frequency of fundamental frequency (e.g., within an operational range of switching frequencies) of the switches for multiple or all modulation modes, such as the first mode, the second mode and the third mode. Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch 64 and low-side switch 62 of any pair or phase will generally be equal or substantially equivalent.

Although the DC primary terminals 84 (e.g., DC primary bus) and the DC secondary terminals 86 (e.g., DC secondary bus) have substantially fixed voltage levels (e.g., within design tolerances), the primary voltage (V1) at (or across) the transformer primary winding 80, or the secondary voltage (V2) at (or across) the transformer secondary winding 82, or both can vary.

In one embodiment, a first voltage sensor 46 (e.g., primary voltage sensor) is configured to measure the primary voltage (e.g., root-mean-squared voltage, peak voltage or other alternating current voltage measurement) and a second voltage sensor 48 (e.g., secondary voltage sensor) is configured to: (a) measure the observed primary and secondary voltages (e.g., root-mean-squared voltage, peak voltage or other alternating current voltage measurement) and (b) provide the measurements observed voltage readings of the primary voltage and secondary voltage (e.g., at the transformer terminals of the primary winding and secondary winding) to the electronic controller 38 via one or more data ports 42. In another embodiment, the first voltage sensor 46 and the second voltage sensor 48 may measure one or more of the following: alternating current (AC) voltage levels, root-mean-squared (RMS) voltage levels, or rectified alternating current (e.g., via a half-wave or full-wave bridge rectifier) at one or more transformer windings (80, 82). Further, the electronic controller 38 or electronic data processor 32 is configured to estimate the DC primary voltage at the DC primary (input) terminals 84 and the DC secondary voltage at the DC secondary output terminals 86 of the converter 11 based on the measurements, or can control the switches in an initialization mode or test mode to facilitate direct measurement of the primary voltage at the DC primary (input) terminals 84 and the secondary voltage at the DC secondary output terminals 86 of the converter.

Alternately, (e.g., during initialization mode or operational mode) the first voltage sensor 146 (in FIG. 1B) and the second voltage sensor 148 (in FIG. 1B) are configured to: (a) measure the primary voltage at the DC primary (input) terminals 84 and the secondary voltage at the DC secondary output terminals 86 of the converter 11, and (b) provide the measurements to the electronic controller 38 via one or more data ports 42. Accordingly, the observed primary voltage and the observed secondary voltage can be or are applied to one or more transferred power equations that apply to the respective control mode to estimate the maximum transferred power for each control mod, among other things.

Figure 1B:
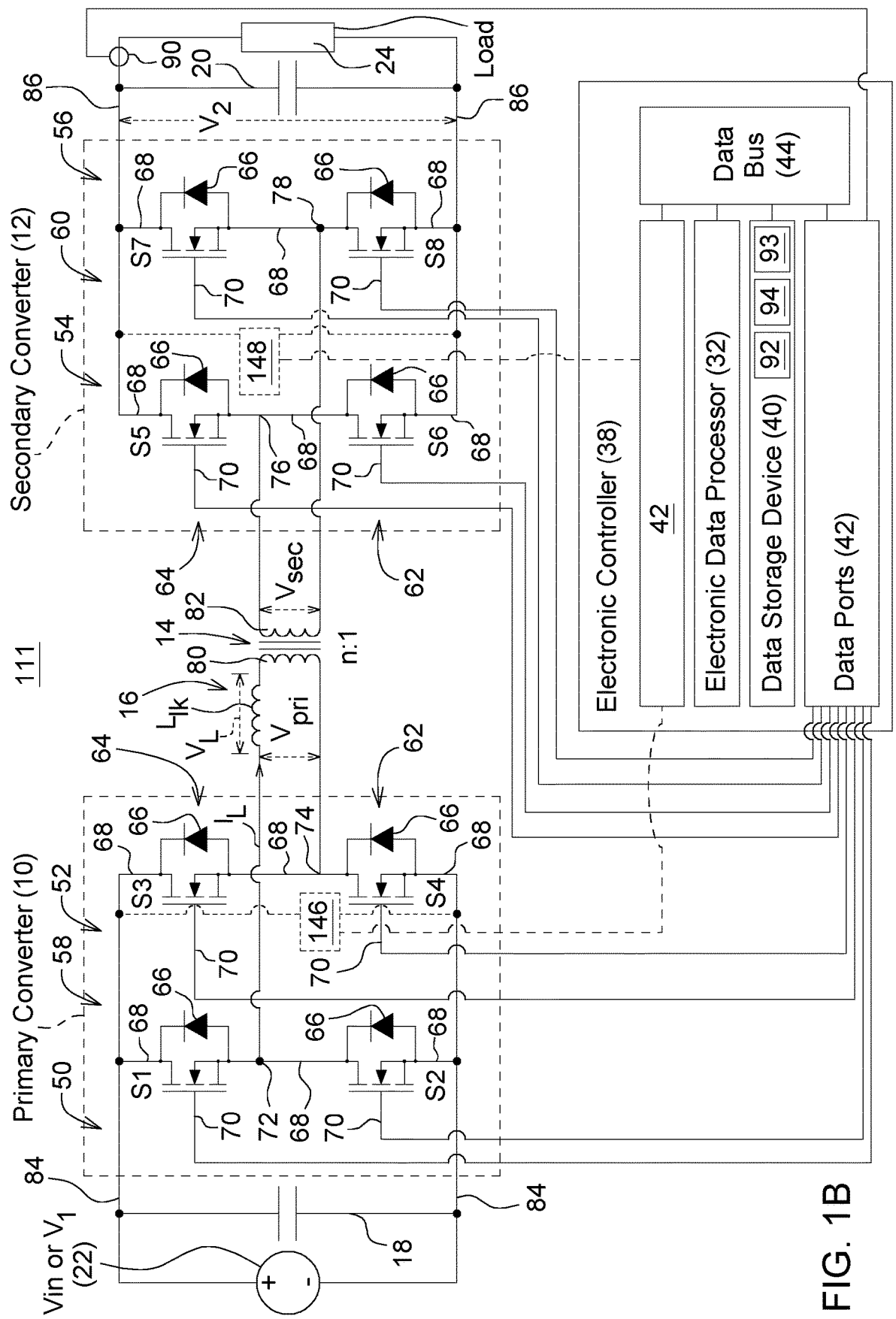
FIG. 1B is a schematic diagram of another embodiment of a direct-current-to-direct-current-converter that comprises a primary full bridge converter coupled to a secondary full bridge converter via a transformer.

FIG. 1B is similar to FIG. 1A, except the first voltage sensor 46 and the second voltage sensor 48 of FIG. 1A are replaced by the first voltage sensor 146 and the second voltage sensor 148 of FIG. 1B. For example, the readings by a first voltage sensor 146 and a second voltage sensor 148 can be applied to the equations set forth in this document that call for the DC primary voltage (V1 or Vin) at terminals 84 or DC secondary voltage (V2 or Vout) at terminals 86, where Vin and Vout are illustrated in FIG. 1A and FIG. 1B. In an alternate embodiment, the first voltage sensor 146 or the second voltage sensor 148 may be omitted if the DC primary voltage (V1) is fixed or regulated within a certain tolerance and the second voltage sensor 148 may be omitted if the DC secondary voltage (V2) is fixed or regulated within a certain tolerance (e.g., in accordance with design-specifications).

Figure 1C:
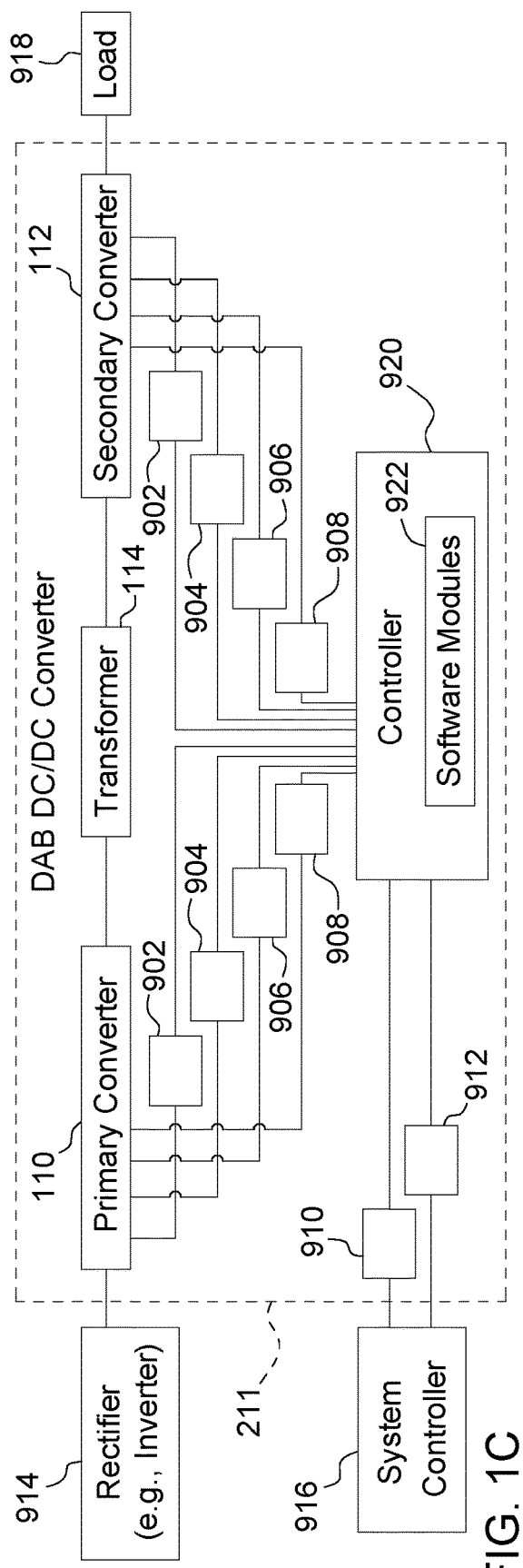
FIG. 1C is a schematic diagram of yet another embodiment of a direct-current-to-direct-current converter that comprises a primary full bridge converter coupled to a secondary full bridge converter via a transformer with two phase windings.

FIG. 1C is a block diagram of one embodiment of a direct-current-to-direct-current converter 211 that comprises a primary full bridge converter 110 coupled to a secondary full bridge converter 112 via a transformer 114. Like reference numbers in FIG. 1B and FIG. 1C indicate like elements or features.

In FIG. 1C, the dual-active bridge DC-DC converter 211 comprises a primary converter 110 and a secondary converter 112 coupled to a transformer 114. The input of the primary converter 110 may be associated with an energy source, such as a battery pack, an ultracapacitor, or a rectifier 914 (e.g., bidirectional inverter) that rectifies alternating current power generated by an electric machine (e.g., alternator), or from the electrical grid. The secondary output of the secondary converter 112 is coupled to a load 918.

An electronic controller 920 is coupled to the primary converter 110 and the secondary converter 112. The electronic controller 920 has one or more software modules 922, such as a parallel compensation module 93, a current measurement module 92, a voltage measurement module 94, and a temperature compensation module 95. The parallel compensation module 93 may comprise a droop control module 321 (e.g., droop compensation module), or a reference voltage compensator 808, or both.

In one embodiment, the primary converter (10, 110, 410) comprises a (gate or switch) driver (318, 902) and one or more of the following sensors: a temperature sensor (96, 904), a voltage sensor (46, 146, 906) and a current sensor (90, 908). Meanwhile, the secondary converter (12, 112, 413) comprises a (gate or switch) driver 902 and one or more of the following sensors: a temperature sensor (97, 904), a voltage sensor (48, 149, 906), and a current sensor (90, 908).

The electronic controller 920 is coupled to a system controller 916 that can communicate via a vehicle data bus 910 (e.g., controller are network (CAN) data bus) and a battery management system data bus 912.

Figure 1D:
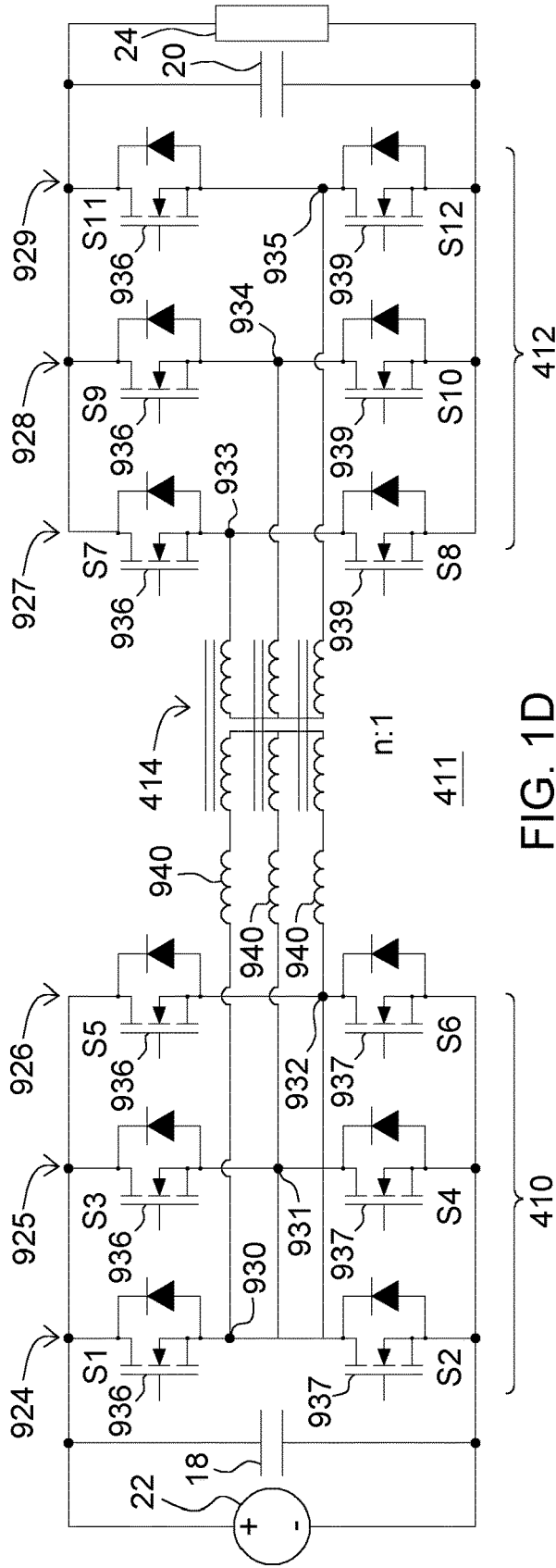
FIG. 1D is a schematic diagram of still another embodiment of a direct-current-to-direct-current converter that comprises a primary full bridge converter coupled to a secondary full bridge converter via a transformer with three phase windings.

FIG. 1D is a schematic diagram of another embodiment of a direct-current-to-direct-current converter 411 that comprises a primary converter 410 coupled to a secondary converter 412 via a transformer 414 with three-phase windings. The DC-to-DC converter of FIG. 1D is similar to the DC-to-DC converter of FIG. 1A and FIG. 1B that featured a full-bridge primary converter (10, 110), a full-bridge secondary converter (12,112), and a single-phase transformer (14,114), except the DC-DC converter 411 of FIG. 1D has a (three-phase) primary converter 410, a (three-phase) secondary converter 412 and transformer 414 with three-phase windings.

In FIG. 1D, the DC terminals of the primary converter 410 are coupled to the primary capacitor 18 and an energy source 22, such as a battery. Each half-bridge (924, 925, 926) of primary converter 410 comprises pair of a low-side semiconductor switch 937 and a high-side semiconductor switch 936. For example, the first half-bridge 924 or first phase comprises the pair of semiconductor switches (S1 and S2); the second half-bridge 925 or second phase comprises the pair of semiconductor switches (S3 and S4); the half-bridge 926 or third phase comprises the pair of semiconductor switches (S5 and S6). The primary converter 410 has three primary alternating-current (AC) phase nodes or AC terminals (930, 931, 932). Each AC phase node is coupled to the primary windings of the transformer 414 via integral inductances 940 (e.g., leakage inductances or similar discrete inductors). In certain embodiments, the integrate inductances 940 are suitable to facilitate the transfer of energy from the primary converter 410 to the secondary converter 412; henceforth, to the load 24.

The secondary AC phase nodes (933, 934, 935) of the secondary converter 412 (e.g., rectifier) are coupled to respective pairs of low-side semiconductor switches 939 and high-side semiconductor switches 938. For example, the first phase 927 or first half bridge comprises the pair of semiconductor switches (S7 and S8); the second phase 928 or second half bridge comprises the pair of semiconductor switches (S9 and S10); the third phase 929 or third half bridge comprises the pair of semiconductor switches (S11 and S12). The DC terminals of the secondary converter 412 are coupled to the secondary capacitor 20 and the load 24. The electronic controller of FIG. 1A, FIG. 1B, or FIG. 1C can be configured to or adapted to provide control signals to the control terminals of all three phases of the semiconductor switches of FIG. 1D.

DC-DC Converters for Coupling in Parallel at a Common Load

In accordance with one aspect of the disclosure, a dual-active-bridge converter system (11, 111, 211, 411) comprises a first primary converter (10, 110, 410), a first transformer (14, 114, 414), a first secondary converter (12, 112, 412), and a first electronic controller (38 or 920).

The first primary converter has a first switched terminal of low-side semiconductor switch that is coupled to a corresponding second switched terminal of high-side semiconductor switch at a first primary alternating current node. The low-side semiconductor switch has a second switched terminal that is coupled to one terminal of a first primary direct current bus. The high-side semiconductor switch has a first switched terminal that is coupled to another terminal of the first primary direct current bus.

A first secondary converter has a first switched terminal of low-side semiconductor switch that is coupled to a corresponding second switched terminal of high-side semiconductor switch at a first secondary alternating current node. The low-side semiconductor switch has a second switched terminal that is coupled to one terminal of a first secondary direct current bus. The high-side semiconductor switch has a first switched terminal coupled to another terminal of the first secondary direct current bus.

In accordance with another aspect of the disclosure, a first output voltage sensor is configured to measure a first observed output voltage the first secondary converter. A first output current sensor is configured to measure a first observed output current of the first secondary converter. A first transformer coupled between the first primary current node and the first secondary current node.

A first electronic controller (38 or 920) is configured to provide control signals to the control terminals of the semiconductor switches of the first primary converter and the first secondary converter based on a commanded current or target output current; the first electronic controller is configured to adjust or increase the output impedance or output resistance (at the secondary DC output terminals) of the first secondary converter (or of the first primary converter and the first secondary converter for bi-directional operation) based on a first droop compensation module or a first parallel compensation module 93 responsive to a current error or current difference between the target output current and the observed output current.

Figure 2:
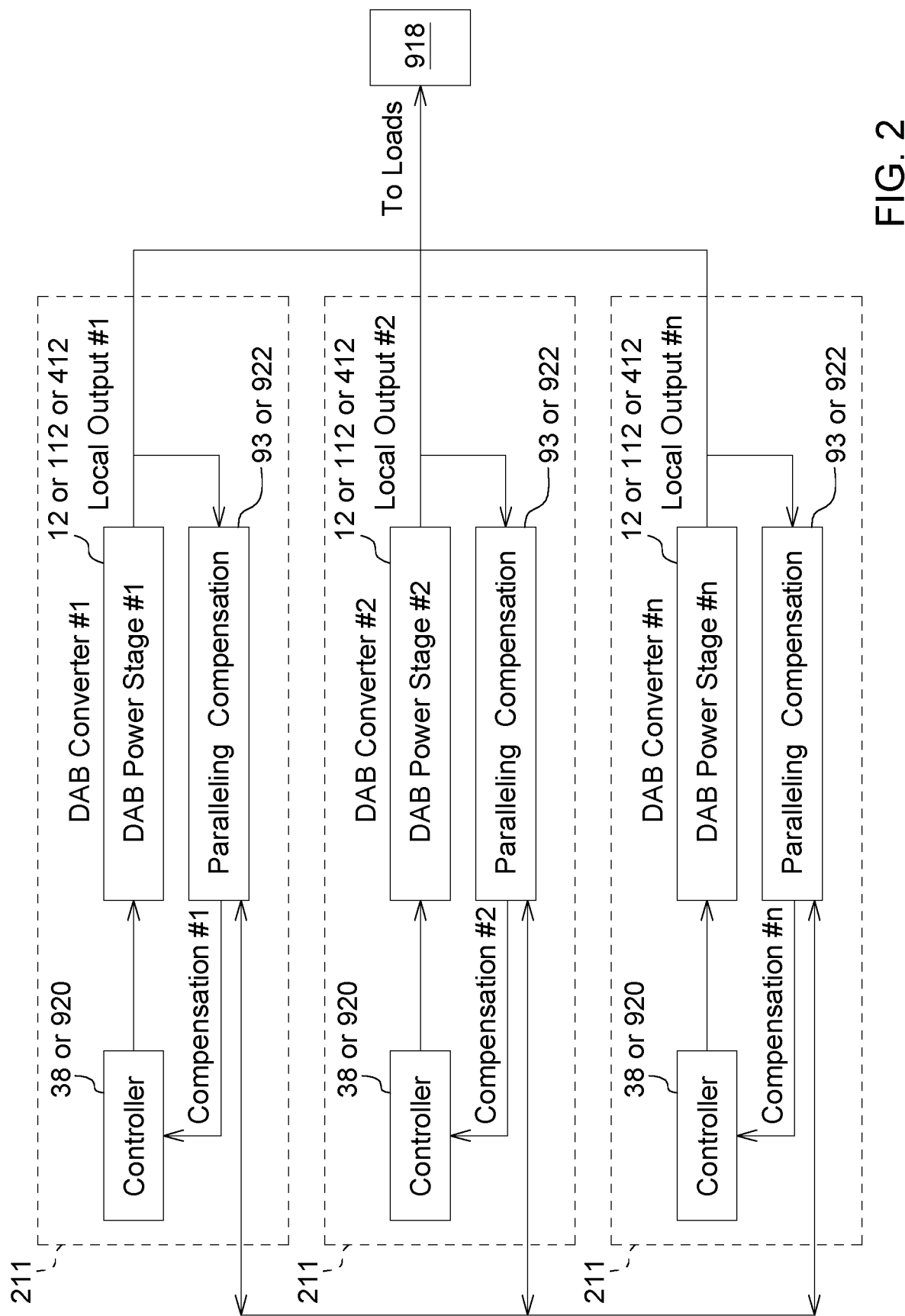
FIG. 2 is a block diagram of three DC-to-DC converters coupled in parallel to provide electrical energy to a common load.

In one example, as illustrated in FIG. 2, a parallel converter system comprises a two or more DC-to-DC converters (11, 111, 211, 411) that are coupled in parallel to support a common load (24, 918). For example, a first DC-to-DC converter (11, 111, 211, 411) and a second DC-DC converter (11, 111, 211, 411) may have DC output terminals of a secondary converter (12, 112, 412) or rectifier bridge that are coupled together to feed a common load (24, 918). In particular, a first direct-current to direct-current converter comprises the first primary converter, the first secondary converter, the first output voltage sensor, the first output current sensor, the first transformer and the first electronic controller, and having first direct current output terminals. Meanwhile, a second direct-current to direct-current converter has second direct current output terminals coupled in parallel to the first direct current output terminals at a parallel output node.

In certain configurations, the second direct current-to-direct current converter comprises a second primary converter having a first switched terminal of low-side semiconductor switch coupled to a corresponding second switched terminal of high-side semiconductor switch at a second primary alternating current node; the low-side semiconductor switch has a second switched terminal that is coupled to one terminal of a second primary direct current bus; the high-side semiconductor switch has a first switched terminal that is coupled to another terminal of the second primary direct current bus.

Similar to the first secondary converter of the first DC-to-DC converter, a second secondary converter of the second DC-to-DC converter has a first switched terminal of low-side semiconductor switch that is coupled to a corresponding second switched terminal of high-side semiconductor switch at a second secondary alternating current node; the low-side semiconductor switch has a second switched terminal that is coupled to one terminal of a second secondary direct current bus; the high-side semiconductor switch has a first switched terminal that is coupled to another terminal of the second secondary direct current bus.

In the second DC-to-DC converter, a second output voltage sensor is configured to measure a second observed output voltage the second secondary converter; a second output current sensor is configured to measure a second observed output current of the second secondary converter.

In the second DC-to-DC converter, the second transformer coupled between the second primary current node and the second secondary current node. Further, in the second DC-to-DC converter, a second electronic controller is configured to provide control signals to the control terminals of the semiconductor switches of the second primary converter and the second secondary converter based on a commanded current or target output current; the second electronic controller, electronic data processor 32 or parallel compensation module 93 (e.g., duty-cycle control module) is configured to do one or more of the following: (a) adjust or increase the output impedance or output resistance of the second secondary converter (at its secondary DC output terminals), or (b) adjust or increase the output resistance of first secondary converter (at its secondary DC output terminals), or (c) simultaneously adjust or increase the output impedance or output resistance of first secondary converter and the second secondary converter (at their respective second DC output terminals, (d) adjust or increase the output impedance or output resistance of the second primary converter (at its primary DC output terminals) for an optional load (not shown) coupled to the primary DC output terminals, where the DC-to-DC converter is bi-directional, or (e) adjust or increase the output resistance of first primary converter (at its primary DC output terminals) for an optional load (not shown) coupled to the primary DC output terminals, where the DC-to-DC converter is bi-directional, (f) simultaneously adjust or increase the output impedance or output resistance of first primary converter and the second primary converter (at their respective first DC output terminals) for an optional load (not shown) coupled to the primary DC output terminals, where the DC-to-DC converter is bi-directional, and (g) adjust or increase the output impedance or output resistance of the DC-to-DC converter at both its primary DC terminals and secondary DC terminals (e.g., for bi-directional operation or for damping and stability against transient disturbances). The first DC-DC converter can adjust or increase output impedance or output resistance at any of its DC output terminals based on a first droop compensation module or parallel compensation module 93 based on a second droop compensation module or a second parallel compensation module 93 responsive to a current error or current difference between the target output current and the observed output current. Meanwhile, the second DC-DC converter can adjust or increase output impedance at any of its DC output terminals based on a second droop compensation module or a second parallel compensation module 93 responsive to a current error or current difference between the target output current and the observed output current. Further, current difference equations, disclosed in this document, can inform, by the electronic data processor 32 or electronic controller (38, 920), the estimation, selection or provision of target droop resistance values and/or target compensating voltage values to manage, allocated, minimize or reduce the current error or current difference.

In one embodiment, for two DC-to-DC converters coupled in parallel to each other at a common load, each of the first and second droop compensation modules or the paralleling compensation modules (93, 922) are configured to observe the respective first and second target output currents at the parallel output node and to generate a first compensating voltage, a second compensating voltage, or both for one or more successive time intervals to attenuate the circulating current during transient changes in the load (and at steady-state load conditions). Further, within applicable design tolerances and technical specifications of the DC-to-DC converter, the first compensating voltage and the second compensating voltage are applied consistently with maintenance or attainment of the target DC output voltage, or uniform target DC output voltages at the primary and secondary DC voltage terminals of the DC-to-DC converter.

In certain embodiments for two DC-to-DC converters coupled in parallel to each other at the common load, a first communications device is coupled to the first electronic controller of the first DC-to-DC converter; a second communications device is coupled to the second electronic controller of the second DC-to-DC converter. The first communications device and the second communications device are configured to support a communications channel via a transmission line or wireless communications channel to coordinate the first compensating voltage and the second compensating voltage, or both for one or more successive time intervals to attenuate the circulating current during transient changes in the load (and at steady-state load conditions). For example, the first communications device and the second communications device comprise transceivers configured to communicate over at digital rate of less than 10,000 Kilobits per second or over an equivalent analog signal bandwidth. Further, within applicable design tolerances and technical specifications of the DC-to-DC converter, the first compensating voltage and the second compensating voltage are applied consistently with maintenance or attainment of the target DC output voltage, or uniform target DC output voltages at the primary and secondary DC voltage terminals of the DC-to-DC converter.

The output impedance or output resistance may be adjusted, increased or decreased to facilitate the appropriate power sharing or current allocation between or among multiple DC-to-DC converter that are coupled in parallel (e.g., at a common parallel node) in accordance with various techniques, which may be applied separately or cumulatively.

Under a first technique, an electronic controller (38, 920) (e.g., a first electronic controller), a data processor 32, parallel compensation module 93 (e.g., a droop control module 321 or droop compensation module 321, and reference voltage compensator 808) is configured to adjust or increase the output impedance or output resistance by decreasing the target output current or commanded current at a first secondary direct current (DC) output terminal of the first secondary converter if the observed output current is greater than the target output current by a threshold current error. For example, threshold current error may be defined as an appropriate, suitable or material percentage of the target output current (e.g., 0.5 percent to 5 percent) to trigger an adjustment or increase in the output impedance or output resistance when the output current is greater than the threshold current error.

Under a second technique, an electronic controller (38, 920) (e.g., a first electronic controller), a data processor 32, parallel compensation module 93 (e.g., droop control module 321 or droop compensation module 321, and reference voltage compensator 808) is configured to adjust or decrease the output impedance or output resistance by decreasing a DC output voltage within a lower limit at the first secondary current DC output terminal if the observed output current is greater than the target output current by a threshold current error. For example, threshold current error may be defined as an appropriate, suitable or material percentage of the target output current (e.g., 0.5 percent to 5 percent) to trigger an adjustment or increase in the output impedance or output resistance when the output current is greater than the threshold current error.

Under a third technique, in any embodiments set forth in the disclosure, the electronic controller 38 (39, 920), electronic data processor 32 or first parallel compensation module an electronic controller (38, 920) (e.g., a first electronic controller), a data processor 32, parallel compensation module 93 (e.g., droop control module 321 or a (first) parallel compensation module and reference voltage compensator 808) may determine target output current for the first DC-to-DC converter (11, 111, 211, 411) that is coupled in parallel to a second DC-DC converter (11, 111, 211, 411). The determined target output current may be the mean or average current of the observed output currents of both the first and second DC-to-DC converters. For example, for two DC-to-DC converters coupled in parallel, the mean or average is determined by the sum of the observed output currents divided by 2.

Under a fourth technique, the target output current for the first DC-to-DC converter, second DC-to-DC converter, and any other DC-to-DC converters coupled in parallel may be the mean or average current of the observed output currents for the first, second and other DC-to-DC converters. Accordingly, the general equation for determining the mean or average is the sum of the observed output currents (for each and every DC-DC converter coupled in parallel) divided by the number of active or enabled DC-to-DC converters coupled in parallel. Under one possible definition, active or enabled DC-to-DC converters can be defined as any converter that contributes any portion of its observed output current to the load.

Under a fifth technique, an electronic controller (38, 920) (e.g., a first electronic controller), a data processor 32, parallel compensation module 93 (e.g., droop control module 321 or a parallel compensation module and reference voltage compensator 808) may use a weighted average to share unequally the current between the parallel connected converters. For instance, the unequal current sharing or allocated current sharing may use the weights a and f for the relative percentages of equal or unequal sharing, as expressed in the below equations.

Figure 3:
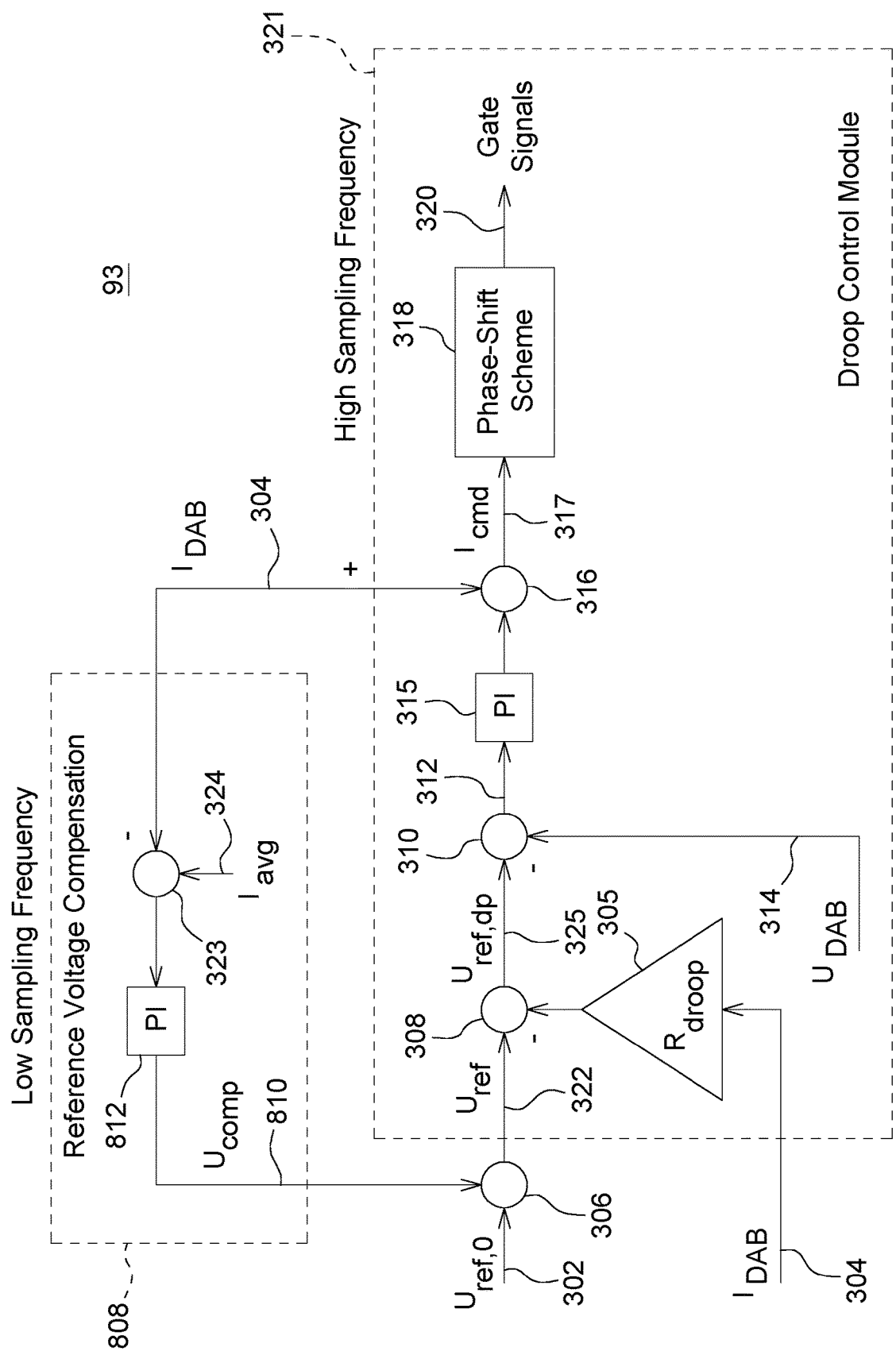
FIG. 3 is a block diagram of parallel compensation module that comprises a droop control module coupled to a reference voltage compensator.

In FIG. 3, the droop control module 321 and the reference voltage compensator 808 may be stored as software instructions or as one or more software modules in the data storage device 40 of the electronic controller 38. In certain embodiments, the droop control module 321 or its associated software instructions may be executed by the electronic data processor 32. For example, the droop control module 321 may comprise an inner control loop that operates: (a) at a first sampling frequency and/or (b) a first bandwidth. In certain embodiments, the reference voltage compensator 808 or its associated software instructions may be executed by the electronic data processor 32. For example, the reference voltage compensator 808 may comprise an outer control loop that operates at: (a) a second sampling frequency, and/or (b) at a second bandwidth, where the second sampling frequency is lower than the first sampling frequency, and where the first bandwidth is greater than the second bandwidth. The reference voltage compensator 208 may be coupled to a communications device for communicating with the other DC-to-DC converters (11, 111, 211) that are coupled in parallel (e.g., to a common load 24) with the present DC-to-DC converter.

As illustrated in FIG. 3, the droop control module 321 comprises a first summer 306 that is coupled to a second summer 308. In turn, the second summer 308 is coupled to a third summer 310.

The first summer 306 receives an input a reference voltage 302, such as reference voltage ($U_{ref,0}$) (e.g., initial, raw or preliminary reference voltage or command voltage) that is generally suitable for establishing the targeted input DC voltage, or output DC voltage of the DC-to-DC converter, or both (e.g., in the absence of mismatched cables or output impedances of DC-to-DC converters coupled in parallel to each other). The first summer 306 has an optional compensating reference voltage input 810 ($U_{comp}$) from the reference voltage compensator 808, if or when the reference voltage compensator 808 is enabled. If the reference voltage compensator 808 is enabled (e.g., during one or more successive sampling intervals), the compensating reference voltage 810 ($U_{comp}$) is added or subtracted from the reference voltage 302 ($U_{ref,0}$) to determine a refined reference voltage 322 ($U_{ref}$).

The refined reference voltage 322 ($U_{ref}$) forms the input to the second summer 308. The second summer 308 has another input from the droop amplifier 305 (or droop attenuator) that has a negative gain that is proportional to a resistance (e.g., $R_{Droop}$ or droop resistance) that is applied to reduce the output current ($I_{DAB}$) of the DC-to-DC converter, which can compensate for misalignment of cable lengths, impedances, or component tolerances of DC-to-DC converters (11, 111, 211 that are coupled in parallel to each other to drive, energize or power a common load 24. Under one interpretation, the negative gain of the amplifier 305 (or attenuator) or the resistance of the amplifier (or attenuator) is analogous to a virtual resistance that is coupled in series with the output impedance of one or more DC-DC converters (11, 111, 211) to reduce any potentially circulating current between (or among) parallel-coupled DC-to-DC converters and/or to approach (e.g., or tend toward) substantially matched or equalized impedance at the output terminals of the DC-DC converters (11, 111, 211) coupled in parallel to each other. The amplifier 305 has input terminals for receiving the observed output current 304 ($I_{DAB}$) of the DC-to-DC converter.

In response the positive input (or optionally negative input) of the refined reference voltage 322 ($U_{ref}$) and the negative input of the droop compensating voltage generated by the amplifier 305 or attenuator, the second summer 308 outputs the droop-compensated reference voltage 325 ($U_{ref,dp}$), which is applied to the third summer 310, along with a negative input of the output voltage 314 ($U_{DAB}$) of the DC-to-DC converter. For example, the output voltage of DC-to-DC converter (11, 111, 211) may comprise the output voltage of the secondary converter or output bridge rectifier of the DC-to-DC converter. The difference between the droop-compensated reference voltage and the observed output voltage ($U_{DAB}$), represents a voltage error 312 that can be applied to the control module 315, such as a proportional integral control module. For certain embodiments, the voltage error 312 may be associated with a DC voltage offset or bias, a measurement error or bias, a sensor measurement error or bias, a sensor or hardware processing error or bias, or analog-to-digital conversion error or bias, for example.

In one embodiment, the control module 315 may comprise a proportional integral control module that is provides feedback to adjust a control signal (e.g., electrical current control signal) as an output that is proportional to a linear combination of the input (e.g., voltage error) and the time integral of the input (e.g., voltage error), such that the feedback can be used to correct the control signal, such as a target output current that corresponds to, or that is proportional to, the voltage error. For example, the output comprises a target output current that is proportional to the error (e.g., voltage error) that is superimposed on a ramp obtained by integrating the input.

In one configuration, the commanded current component (Icon) of the control module can be modeled by the following control equation:

$$Icon = \frac{kps + ki}{s}[Uref, dp - U_{DAB}],$$

kp is a first controller constant;
ki is a second controller constant;
s equals $j\omega$, where $\omega$ is the frequency response for the controller that is aligned with the switching frequency;
$U_{DAB}$ is the output voltage across the terminals of the secondary capacitor;
$U_{ref,dp}$ is the $U_{ref}$ adjusted for the droop voltage reduction ($I_{DAB}R_{droop}$) or droop resistance; and
$U_{ref}$ is the reference voltage.

$$U_{ref,dp} = U_{ref} - I_{DAB}R_{droop}$$

Accordingly, the commanded current is:

$$Icmd = \frac{kps + ki}{s}[Uref, dp - U_{DAB}] + I_{DAB}$$

The third summer 316 receives current inputs of: (a) the observed output current 304 ($I_{DAB}$) from the DC-DC converter, and (b) the target output current from the control module 315, Based on the foregoing inputs, the third summer 316 outputs a commanded current 317 ($I_{cmd}$). For example, in some configurations, the commanded current ($I_{cmd}$) reflects or incorporates the prior adjustment (e.g., droop compensation) based on the compensating droop voltage (e.g., to compensate for measurement error and/or bias associated with the sensor, hardware, or data processing of sensor measurements).

The third summer 316 is coupled to the driver 318 (e.g., driver with phase shift scheme module), which is coupled to the control terminals of the semiconductor switches of the DC-to-DC converter (11, 111, 211). In one embodiment, a driver 318 (e.g., phase shift scheme) provides control signals at set of control terminals 320 to the semiconductor switches (68, 936, 937, 938, 939) with any phase shift required: (a) to synchronize properly the control signals that contribute to DC output signals of (e.g., rectifying or secondary) switches (68, 938, 939) of the parallel DC-DC converters (e.g., at the common load via cables and their respective relative impedances), and (b) to adjust or increase the relative output impedance or relative output resistance of the rectifying switches of parallel DC-DC converters. The droop gain (applied to amplifier or attenuator 305) can improve the damping performance of the DC-to-DC converter at the output load and reduce any potential current oscillation during transient response of the droop control module or droop compensation loop, as opposed to the voltage regulation module.

In FIG. 3, the reference voltage compensator 808 provides an adjustment to the reference voltage based on the observed output current, where the reference voltage is a precursor to the voltage output at the output terminals of the rectifier bridge or secondary converter of the DC-DC converter (11, 111, 211, 411), where the output terminals are coupled to a load 24.

The reference voltage compensator 808 is programmed with one or more different strategies. Under a first strategy, the reference voltage compensator is configured to equally share current output (e.g., mean current output or average current output) into the common load, between or among each DC-DC converter (11, 111, 211, 411) that is coupled in parallel to the load 24. Under a second strategy, the reference voltage compensator 808 is configured to share current output unequally to the common load, according to a specific allocation of power or current sharing between or among two or more DC-DC converters (11, 111, 211, 411). The electronic data processor 32, the electronic controller (38 or 920) and the parallel compensation module 93 are configured to apply one or more equations to estimate or manage current differences, where such equations can be used for the first strategy and the second strategy, as explained below.

The reference voltage compensator 808 comprises a fifth summer 323 that is coupled to a control module 321. The fifth summer 323 outputs a current error based on the difference between the observed output current 304 ($I_{DAB}$) and the strategic reference current 324 (e.g., $I_{avg}$). For example, the strategic reference current 324 can be an average or mean current between two DC-DC converters (11, 111, 211, 411) coupled in parallel.

The reference voltage compensator 808 may comprise a proportional integral control module 812 that is provides feedback to adjust a control signal (e.g., electrical voltage control signal) as an output is proportional to a linear combination of the input (e.g., current error) and the time integral of the input (e.g., current error), such that the feedback can be used to correct the control signal, such as a target output voltage 810 ($U_{comp}$) that corresponds to, or that is proportional to, the current error. For example, the output of the control module 812 comprises a target output voltage 810 that is proportional to the error (e.g., current error) that is superimposed on a ramp obtained by integrating the input.

Each DC-to-DC converter normally operates in voltage control mode to regulate the voltage output at the DC output terminals to constant or uniform target voltages. Further, each DC-to-DC converter can operate in a droop-control mode, or a current command mode. In reference voltage compensating mode, alone or together with the droop-control mode, the compensation module 808 generates a compensating voltage to the observed output voltage (e.g., to supplement the normal voltage control mode) as a negative feedback input to a controller to reduce the commanded current and output power-sharing mismatch at the output node. Further, in the reference voltage compensating mode, alone or together with the droop-control mode, the compensating voltage can be configured as a component of a reference voltage, wherein a reference voltage is reduced by droop gain or droop resistance based on the observed output current.

In one embodiment, the droop control module can adjust (e.g., equalize) the output impedance (Zo t) of each DC-to-DC converter that is coupled in parallel. For example, a first droop resistance is added (e.g., by the droop control module 321, or by driver 318, or by switchable, fixed or variable resistances connected in parallel between a DC output terminal and ground of the DC-DC converter) to the first output impedance of the first DC-to-DC converter and a second droop resistance is added (e.g., by the droop control module 321 or driver 318, or by switchable, fixed or variable resistances connected) in parallel between a DC output terminal and round of the DC-DC converter) to the second output impedance of the second DC-to-DC converter, where the first output impedance is equal to or commensurate with the second output impedance. Further, the first droop resistance and the second droop resistance may be approximately equal and may predominate over: (a) the initial first output impedance of the DC output terminals or initial second input impedance of the DC output terminals, and/or (b) output cable impedances (702, 712), such as $Z_{cable1}$ and $Z_{cable2}$.

However, if there is circulating current between or among different DC-to-DC converters (11, 11, 211, or 411) coupled in parallel to a common load, circulating current that is caused by the voltage measurement offset may not (or cannot) be eliminated by only adjusting the output impedance. Instead, the reference voltage compensator can compensate for voltage measurement offset; hence, can be used to eliminate the circulating current and achieve or approach ideal steady-state current sharing. The reference voltage compensator is associated with communications device to support communications between or among other voltage compensators and DC-to-DC converters. To the extent communications is available between communications devices coupled to DC-to-DC converters that are coupled in parallel to a common load, an additional feedback loop can be used to adjust the reference voltage to balance the current and to reduce circulating current.

In certain embodiments, the reference voltage compensator 808 can eliminate a current difference that has components resulting from any of the following: (a) unbalanced or mismatched cable impedance, and/or (b) measurement voltage differences, and/or (c) other DC offset currents. For example, the reference voltage compensator 808 may minimize or reduce the current difference ($I_{diff}$) between two DC-DC converters coupled in parallel in accordance with the following equations, which are based on approximately equal current sharing with respect to the common load:

$$I_{diff} = I_{DAB1} - I_{DAB2}$$

$$I_{diff} = \frac{sI_{DAB2}(Z_{out2} + Z_{cable2} - Z_{out1} - Z_{cable1}) + s(d_1 - d_2)}{s(Z_{out1} + Z_{cable1}) + k_p s + k_i}$$

where $I_{load}/2=(I_{DAB1}+I_{DAB2})=I_{avg}$ (e.g., possible input to the summer 323 of the reference voltage compensator 808) and where:

$I_{DAB2}$ is the output current of the second DC-to-DC converter coupled in parallel, $Z_{out2}$ is the second output impedance of the second DC-to-DC converter, $Z_{cable2}$ is the second cable coupled between the DC output of the DC-to-DC converter and the load;

$Z_{out1}$ is the first output impedance of the first DC-to-DC converter, $Z_{cable1}$ is the first cable coupled between the DC output of the DC-to-DC converter and the load;

kp is a first controller constant;

ki is a second controller constant;

s equals jω, where ω is the frequency response for the controller that is aligned with the switching frequency;

$d_1$ is the first measurement noise associated with a first voltage sensor or current sensor, its hardware, or data processing, $d_2$ is the second measurement noise associated with a first voltage sensor or second current sensor, its hardware, or data processing.

In the above equation, if the steady-state $Z_{out}$ is equal to $R_{droop}$; if $R_{droop1}=R_{droop2}$ for preliminary or initial preset droop gain settings, the above equation can be simplified as follows to minimize the current difference ($I_{diff}$) between two DC-DC converters coupled in parallel based on approximately equal current sharing with respect to the common load:

$$I_{diff} = \frac{sI_{DAB2}(Z_{cable2} - Z_{cable1}) + s(d_1 - d_2)}{s^2 L_{cable} + (R_{cable} + R_{droop})s + k_p s + k_i},$$

where $L_{cable}$ is the inductance of the cable between the DC output of DC-to-DC converter and load, and $R_{cable}$ is the resistance of the cable between the DC output of the DC-to-DC converter and the load.

For example, in the above equation, the reference voltage compensator is configured to minimize the current difference to compensate for fixed, mismatched cable resistance ($R_{cable}$) or impedance and to compensate for the voltage measurement errors ($d_1$, $d_2$) inherent in the voltage sensors, digital-to-analog conversion or signal processing by adjusting the control coefficients kp and ki of the control module and/or by adjusting the output current ($I_{DAB2}$) of the second DC-to-DC converter via communications from the first DC-to-DC converter.

In another embodiment, the reference voltage compensator may minimize or reduce the current difference ($I_{diff}$) between two DC-DC converters coupled in parallel in accordance with the following equations, which are based on partial or fractional current sharing, including but not limited to unequal current sharing (e.g., collectively universal current sharing) with respect to the common load:

$$I_{diff} = \frac{sI_{DAB2}\left(Z_{out2} + Z_{cable2} - \frac{a}{\beta}Z_{out1} - \frac{a}{\beta}Z_{cable1}\right) + s(d_1 - d_2)}{\frac{s}{\beta}(Z_{out1} + Z_{cable1}) + 2k_p s + 2k_i}$$

Where $I_{ref,1} = \alpha(I_{DAB1} + I_{DAB2})$ $I_{ref,2} = \beta(I_{DAB1} + I_{DAB2})$ $\alpha + \beta = 1$ α is the sharing percentage of load for the first DC-to-DC converter coupled in parallel to the second DC-to-DC converter to the common load;

β is the sharing percentage of load for the second DC-to-DC converter coupled in parallel to the first DC-to-DC converter to the common load;

$I_{DAB1}$ is the output current of the first DC-to-DC converter coupled in parallel, $I_{DAB2}$ is the output current of the second DC-to-DC converter coupled in parallel, $Z_{out1}$ is the first output impedance of the first DC-to-DC converter, $Z_{cable1}$ is the first cable coupled between the DC output of the DC-to-DC converter and the load;

$Z_{out2}$ is the second output impedance of the second DC-to-DC converter, $Z_{cable2}$ is the second cable coupled between the DC output of the DC-to-DC converter and the load;

kp is a first controller constant;

ki is a second controller constant;

s equals jω, where ω is the frequency response for the controller that is aligned with the switching frequency;

$d_1$ is the first measurement noise associated with a first voltage sensor or current sensor, its hardware, or data processing, $d_2$ is the second measurement noise associated with a first voltage sensor or second current sensor, its hardware, or data processing.

In the above equations, within the first DC-to-DC converter, $I_{ref,1}$ can be applied to an input of the summer 323 of the reference voltage compensator; within the second DC-to-DC converter, $I_{ref,2}$ can be applied to an input of the summer 323 of the reference voltage compensator 808.

Although the reference voltage compensator of the outer loop can eliminate the steady-state current error between $I_{ref}$ and $I_{DAB}$ regardless $R_{droop}$, the selection of droop gain can affect the dynamic performance (e.g., can improve stability and damping response to transient disturbances) of the DC-to-DC converters that are coupled in parallel to a common load. To minimize the current difference ($I_{diff}$) during a transient period of tracking electrical current, the droop control module may set the droop gain to satisfy the following with respect to the above equation:

$$R_{droop2} = \frac{\alpha}{\beta}R_{droop1},$$

$R_{droop1}$ is the droop resistance or droop gain of the first DC-to-DC converter coupled in parallel to the second DC-to-DC converter to a common load, and where $R_{droop2}$ is the droop resistance or droop gain of the second DC-to-DC converter coupled in parallel to the first DC-to-DC converter to the common load.

In current command mode, which is distinct from the droop control model, the communications devices facilitate communications between or among the compensation modules of the DC to DC converters to adjust the commanded currents of one or more both DC to DC converters to equalize the output currents at the output node or to eliminate power-sharing mismatch among or between the DC to DC converters at the output node.

In the droop-control mode, or the commanded current mode, or both the DC-to-DC converters (which are coupled in parallel at a common load at the secondary converter or output rectifier bridges of the DC-to DC converters) are operated with offset duty cycles or with phase-shifted control signals between or among like switches (e.g., each switch in a first DC converter and a corresponding equivalent switch second DC-DC converter are triggered simultaneously or in-phase and in the same sequence of triggered switches) in like switching states (e.g., on or off) to reduce or eliminate power sharing mismatch reduce or eliminate power-sharing mismatch among or between the DC to DC converters at the output node.

As used in this document, droop refers to the reduction of the peak magnitude, peak current level or peak voltage level of a pulse or waveform, where an ideal pulse has a substantially uniform or constant peak magnitude, peak current level or peak voltage level. The amount of droop or sag is the different between the reduced peak magnitude and the ideal constant peak magnitude. The droop or sag can be caused by disturbances or transients in the load coupled to the DC output terminals of a dual active bridge converter. Alternately, the droop or sag can result from coupling the outputs of two or more converters in parallel because of unmatched impedances, unmatched voltages, or unmatched currents at the output of the converters, which can be due to tolerances of components, aging of components, or other factors, for example.

Figure 4:
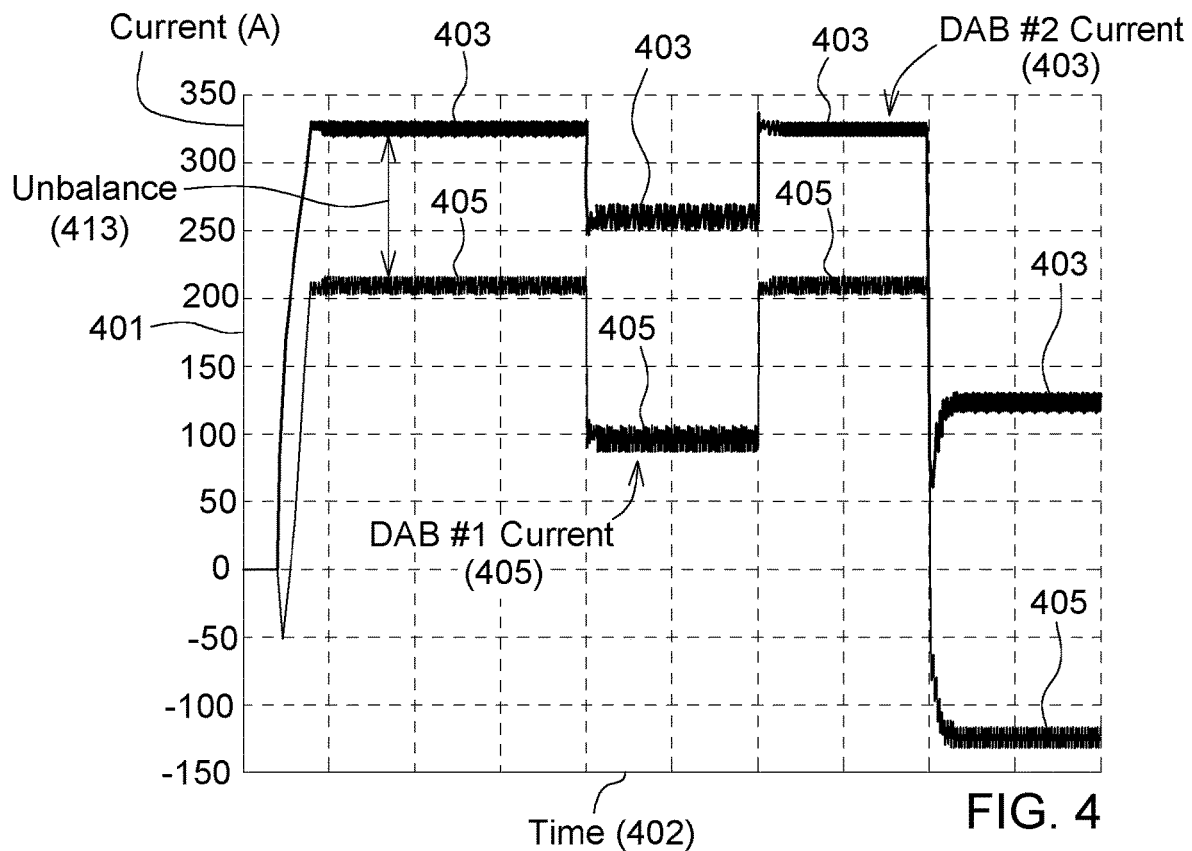
FIG. 4 is a chart that shows current output versus time of two DC-to-DC converters that are coupled in parallel to a common load, where only one of the two DC-to-DC converters has enabled droop control.

FIG. 4 is a chart that shows current output versus time of two DC-to-DC converters (11, 111, 211, 411) that are coupled in parallel to a common load, where only one of the two DC-to-DC converters has enabled droop control. The vertical axis 401 indicates electrical current (e.g., in Amps), whereas the horizontal axis 402 indicates time (e.g., in units of tenths of seconds). In certain (industrial or vehicular applications), the current from each DC-to-DC converter (11, 111, 211, 411) fluctuates with the load or transient conditions associated with the load (24, 118). The lower waveform 405 indicates the electrical current output of the first DC-to-DC converter. Meanwhile, the upper waveform 403 indicates the electrical current output of the second DC-to-DC converter in an unbalanced state or without any droop compensation. As illustrated there is significant electrical current difference between the upper waveform 403 and the lower waveform 405, which indicates that the second DC-to-DC converter is providing more output current to the load than the first DC-to-DC converter does. Hence, the first DC-to-DC converter may be subject to the inflow of current or deleterious circulating current from the second DC-to-DC converter, which can place thermal or electrical stress on the components of the DC-to-DC converter or reduce its longevity.

Figure 5:
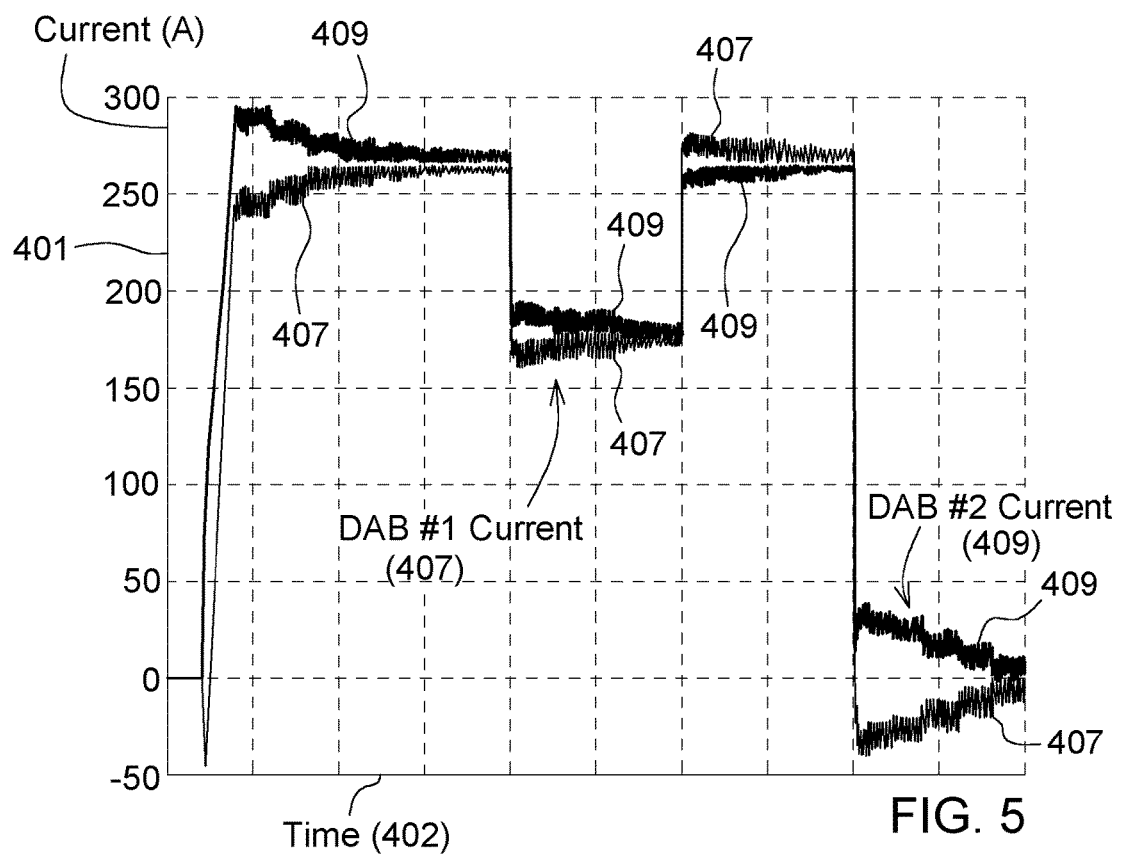
FIG. 5 is a chart that shows current output versus time of two DC-to-DC converters that are coupled in parallel to a common load, where both of the two DC-to-DC converters have enabled droop control.

FIG. 5 is a chart that shows current output versus time of two DC-to-DC converters (that are coupled in parallel to a common load, where both of the two DC-to-DC converters (11, 111, 211, 411) have (both) enabled droop control. The vertical axis 401 indicates electrical current (e.g., in Amps), whereas the horizontal axis 402 indicates time (e.g., in units of tenths of seconds). In certain (industrial or vehicular) applications, the current from each DC-to-DC converter fluctuates with the load or transient conditions associated with the load. The first waveform 407 indicates the electrical current output versus time of the first DC-to-DC converter with droop compensation (e.g., active droop compensation). Meanwhile, the second waveform 409 indicates the electrical current output versus time of the second DC-to-DC converter with droop compensation (e.g., active droop compensation or active in response to a detected amplitude difference between the two current waveforms (407, 409), where the detected amplitude difference exceeds a threshold. As illustrated there is not a significant electrical current difference between the first waveform 407 and the second waveform 409, which indicates that first DC-to-DC converter and second DC-to-DC converter are each contributing approximately equal output current (e.g., balanced output current) to the load. Hence, neither DC converter is vulnerable to the inflow of current from the other DC converter coupled in parallel, which tends to reduce thermal and electrical stress on the DC-to-DC converters.

Figure 6:
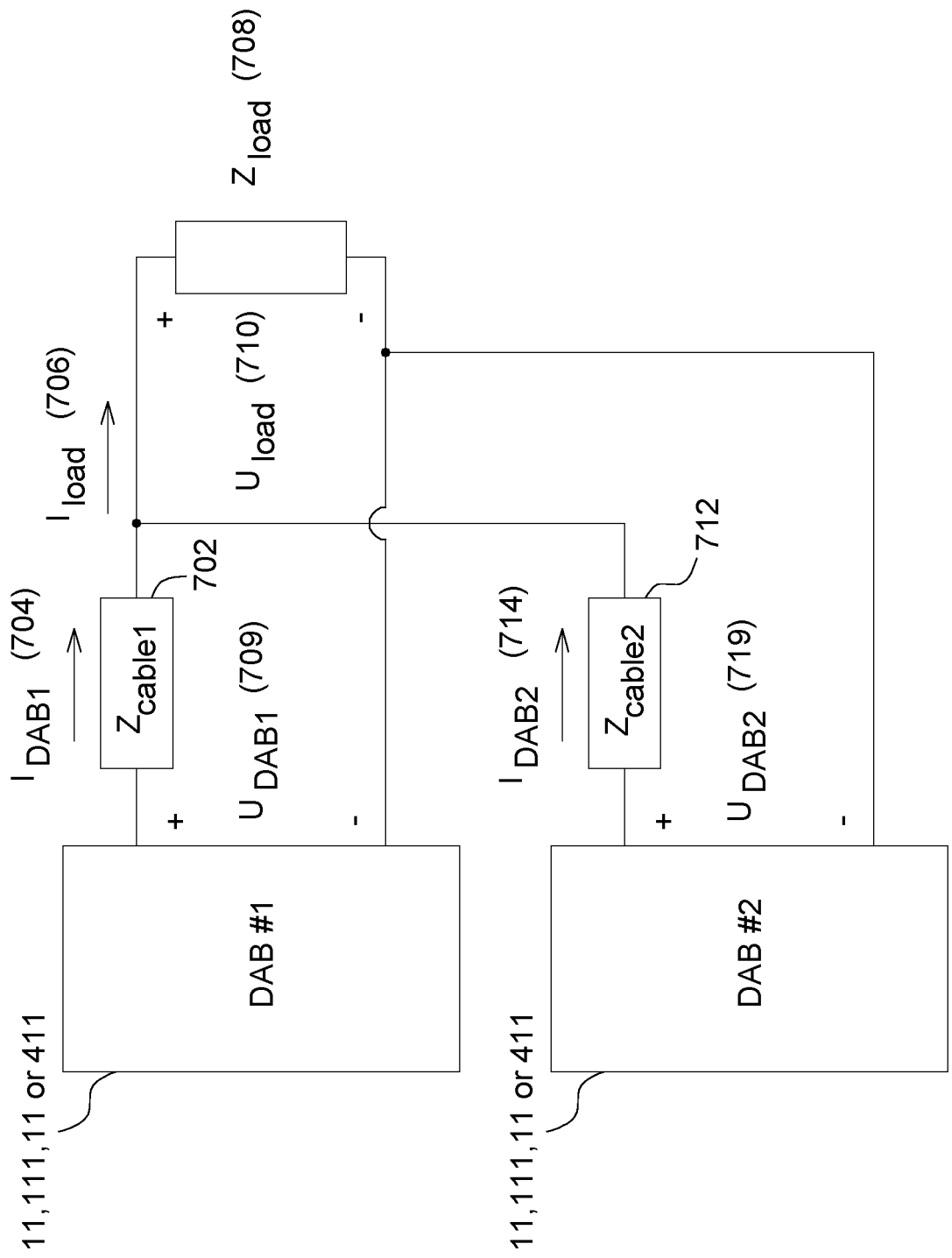
FIG. 6 is a block diagram that shows one embodiment of two DC-to-DC converters coupled in parallel to provide electrical energy to a common load in accordance with equal sharing or universal sharing.

FIG. 6 is a block diagram that shows one embodiment of two DC-to-DC converters (11, 111, 211, 411) (e.g., DC-DC converters) coupled in parallel to provide electrical energy to a common load 708 ($Z_{load}$) in accordance with equal sharing or universal sharing. A first DC-DC converter (11, 111, 211 or 411), at its secondary DC output terminals (e.g., first secondary DC output), is coupled in parallel to a second DC-DC converter (11, 111, 211, or 411), at its secondary DC output terminals (e.g., second secondary DC output). The first DC-DC converter and the second DC-DC converter are coupled in parallel to a common load 708, where, in some embodiments, the first DC-DC converter and the second DC-DC converter can equally contribute output current (704, 714) to the common load 708, in conjunction with the parallel compensation module 93. In other embodiments, the DC-DC converter and the second DC-DC converter can equally contribute different output currents (704, 714) to the common load, in conjunction with the parallel compensation module 93. FIG. 6 illustrates a first cable impedance 702 of a first cable between the first DC output terminal of the first DC-DC converter and the common load; a second cable impedance 712 of a second cable between the second DC output terminal of the second DC-DC converter and a common load 708 ($Z_{load}$) with load current 706 ($I_{load}$) and load voltage 710 ($U_{load}$). The load 706 is analogous to the load 918 or load 24 in other drawings.

The first DC-DC converter outputs a first output current 704 ($I_{DAB1}$) through the first cable impedance 702. The second DC-DC converter outputs a second output current 714 ($I_{DAB2}$) through the second cable impedance 712. The first DC-DC converter comprises a parallel compensation module 93 is configured to manage, allocate, compensate for, reduce or minimize the current difference between the observed current ($I_{DAB1}$) and the target current by adjusting the droop resistance of one or both DC-DC converters and/or by adjusting a reference voltage compensation, while maintaining a substantially uniform and regulated DC output voltage at the secondary DC output terminals of the first DC-DC converter and the second DC-DC converter.

The first DC-DC converter outputs a first DC output voltage 709 ($U_{DAB1}$) at its secondary DC output terminals. Meanwhile, the second DC-DC converter outputs a second DC output voltage 719 ($U_{DAB2}$) at its secondary DC output terminals, where the first DC output voltage generally equals the second DC output voltage with a tolerance (e.g., a tolerance as low as approximately 0.1 percent for certain applications; a tolerance as high as approximately ten percent for other applications).

Figure 7A:
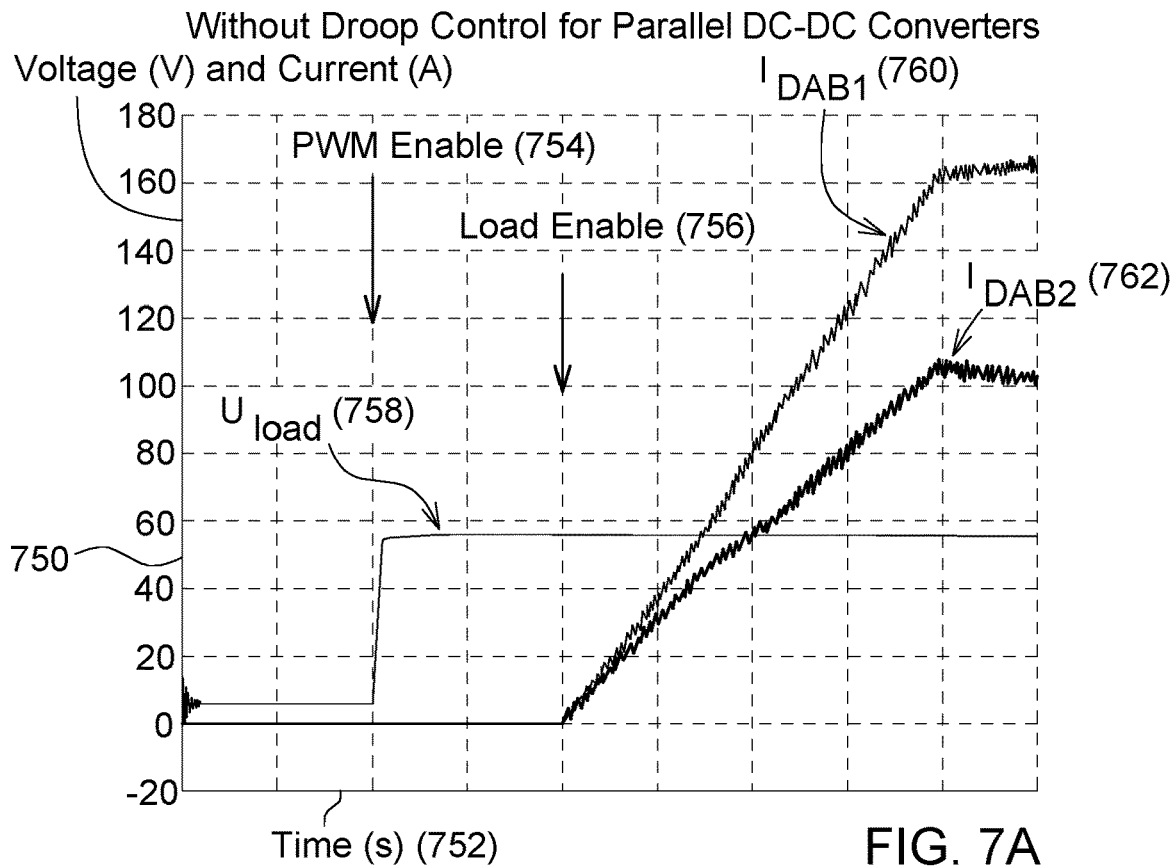
FIG. 7A is a graph of voltage and current versus time for parallel DC-to-DC converters without droop control.

FIG. 7A is a graph of voltage and current versus time for parallel DC-to-DC converters (11, 111, 211, 411) without droop control or where only one of the two DC-to-DC converters has enabled droop control. The vertical axis 750 indicates electrical current (e.g., in Amps) and voltage (e.g., in volts), whereas the horizontal axis 752 indicates time (e.g., in units of seconds). The PWM enable signal (754) enables the driver to send control signals to the control terminals of the switches of the DC-to-DC converters. The load enable signal 756 connects the load to the output of the DC-to-DC converters; hence, the electrical current starts to flow into the load over time. The current from each DC-to-DC converter (11, 111, 211, 411) fluctuates with the load or transient conditions associated with the load (24, 118). However, the DC output voltage 758 ($U_{load}$) remains generally constant at the secondary output terminals or primary output terminals of the DC-to-DC converters that are coupled in parallel to the load.

The upper waveform 760 indicates the electrical current output ($I_{DAB1}$) of the first DC-to-DC converter in an unbalanced state or without any droop compensation. The lower waveform 762 indicates the electrical current output ($I_{DAB2}$) of the second DC-to-DC converter, potentially with droop compensation. As illustrated there is significant electrical current difference between the upper waveform 760 and the lower waveform 762, which indicates that the first DC-to-DC converter is providing more output current to the load than the second DC-to-DC converter does. Hence, the second DC-to-DC converter may be subject to the inflow of current or deleterious circulating current from the first DC-to-DC converter, which can place thermal or electrical stress on the components of the DC-to-DC converter or reduce its longevity. At a given time (e.g., a first time, such as a first time aligned with the second vertical graph line), the PWM enable signal (754) enables the driver to send control signals to the control terminals of the switches of the DC-to-DC converters. Afterwards (e.g. at second time that follows the first time), a load enable signal 756 connects the load to the output of the DC-to-DC converters; hence, the electrical current starts to flow into the load over time.

Figure 7B:
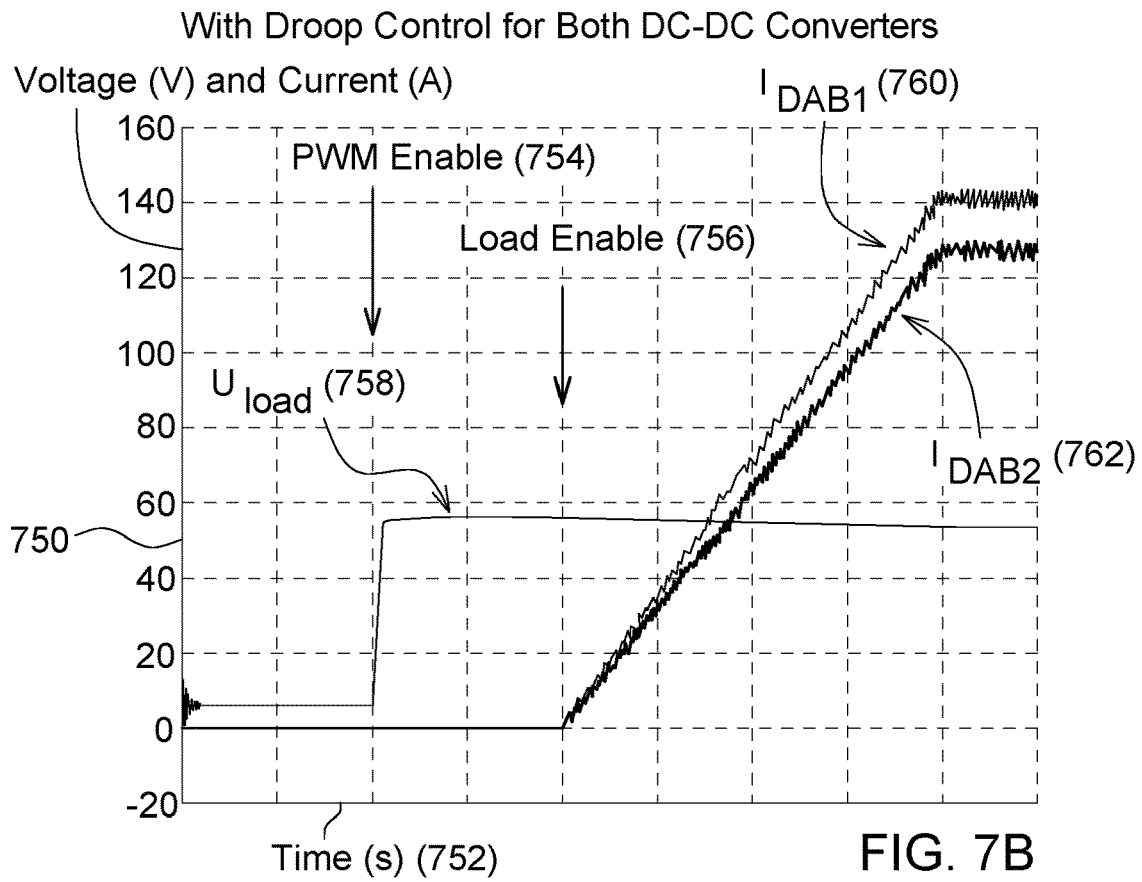
FIG. 7B is a graph of voltage and current versus time for parallel DC-to-DC converters with droop control.

FIG. 7B is a graph of voltage and current versus time for parallel DC-to-DC converters (11, 111, 211, 411) with droop control enabled, where the droop control is enabled for both DC-DC converters to reduce the magnitude of current difference versus time between the current outputs (760, 762) or current output contributions of each DC-to-DC converter. The vertical axis 750 indicates electrical current (e.g., in Amps) and voltage (e.g., in volts), whereas the horizontal axis 752 indicates time (e.g., in units of seconds). At the first time, PWM enable signal (754) enables the driver to send control signals to the control terminals of the switches of the DC-to-DC converters. At the second time following the first time, the load enable signal 756 connects the load to the output of the DC-to-DC converters; hence, the electrical current starts to flow into the load over time. The current from each DC-to-DC converter (11, 111, 211, 411) fluctuates with the load or transient conditions associated with the load (24, 118). However, the DC output voltage 758 ($U_{load}$) remains generally constant at the secondary output terminals or primary output terminals of the DC-to-DC converters that are coupled in parallel to the load.

The upper waveform 761 indicates the electrical current output ($I_{DAB1}$) of the first DC-to-DC converter in a balanced state with droop compensation (e.g., increased resistance or impedance of the DC output terminal) to reduce or minimize the current difference between the electrical current outputs of the two respective, parallel-connected DC-to-DC converters. The lower waveform 762 indicates the electrical current output ($I_{DAB2}$) of the second DC-to-DC converter, with droop compensation (e.g., increased resistance or impedance of the DC output terminal) to reduce or minimize the current difference between the electrical current outputs of the two respective, parallel-connected DC-to-DC converters. As illustrated there only a slight electrical current difference between the upper waveform 761 and the lower waveform 762, which indicates that the first and second DC-to-DC converters are providing approximately equal electrical current contributions to the common load The reduced or minimized current difference between or among parallel-connected DC-to-DC converters reduces thermal and electrical stress on the components and tends to foster longevity of the DC-to-DC converters.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A dual-active-bridge converter system comprising:
a first primary converter having a first switched terminal of low-side semiconductor switch coupled to a corresponding second switched terminal of high-side semiconductor switch at a first primary alternating current node, the low-side semiconductor switch having a second switched terminal coupled to one terminal of a first primary direct current bus; the high-side semiconductor switch having a first switched terminal coupled to another terminal of the first primary direct current bus;

a first secondary converter having a first switched terminal of low-side semiconductor switch coupled to a corresponding second switched terminal of high-side semiconductor switch at a first secondary alternating current node, the low-side semiconductor switch having a second switched terminal coupled to one terminal of a first secondary direct current bus; the high-side semiconductor switch having a first switched terminal coupled to another terminal of the first secondary direct current bus;

a first output voltage sensor configured to measure a first observed output voltage the first secondary converter;

a first output current sensor configured to measure a first observed output current of the first secondary converter;

a first transformer coupled between the first primary current node and the first secondary current node to define a first direct-current-to-direct current converter; and a first electronic controller configured to provide control signals to the control terminals of the semiconductor switches of the first primary converter and the first secondary converter based on a commanded current or target output current; the first electronic controller configured to adjust or increase the output impedance or output resistance at a first secondary direct current (DC) output terminal of the first secondary converter based on a first droop compensation module or a first parallel compensation module responsive to a current error or current difference between the target output current and the observed output current wherein, the first electronic controller is configured to adjust or increase the output impedance or output resistance by decreasing the target output current or commanded current at a first secondary direct current (DC) output terminal of the first secondary converter if the observed output current is greater than the target output current by a threshold current error.

2. The dual active bridge system according to claim 1 further comprising:
a reference voltage compensator configured to reduce or minimize the current difference (Idiff) between the first DC-to-DC converter and second DC-to-DC converter coupled in parallel in accordance with the following equation, which is based on approximately equal current sharing with respect to the common load:

$$I_{diff} = \frac{sI_{DAB2}(Z_{out2} + Z_{cable2} - Z_{out1} - Z_{cable1}) + s(d_1 - d_2)}{s(Z_{out1} + Z_{cable1}) + k_p s + k_i}$$

where:
$I_{DAB2}$ is the output current of the second DC-to-DC converter coupled in parallel,
$Z_{out2}$ is the second output impedance of the second DC-to-DC converter,
$Z_{cable2}$ is the second cable coupled between the DC output of the DC-to-DC converter and the load;
$Z_{out1}$ is the first output impedance of the first DC-to-DC converter,
$Z_{cable1}$ is the first cable coupled between the DC output of the DC-to-DC converter and the load;

kp is a first controller constant;
ki is a second controller constant;
s equals jω, where ω is the frequency response for the controller that is aligned with the switching frequency;
$d_1$ is the first measurement noise associated with a first voltage sensor or current sensor, its hardware, or data processing,
$d_2$ is the second measurement noise associated with a first voltage sensor or second current sensor, its hardware, or data processing.

3. The dual active bridge system according to claim 1 further comprising:
a reference voltage compensator configured to reduce or minimize the current difference ($I_{dif}$) between the first DC-to-DC converter and second DC-to-DC converter coupled in parallel in accordance with the following equations, which are based on any fractional current sharing with respect to the common load:

$$I_{diff} = \frac{sI_{DAB2}\left(Z_{out2} + Z_{cable2} - \frac{a}{\beta}Z_{out1} - \frac{a}{\beta}Z_{cable1}\right) + s(d_1 - d_2)}{\frac{s}{\beta}(Z_{out1} + Z_{cable1}) + 2k_p s + 2k_i}$$

Where $I_{ref,1} = \alpha(I_{DAB1} + I_{DAB2})$ $I_{ref,2} = \beta(I_{DAB1} + I_{DAB2})$ $\alpha + \beta = 1$ α is the sharing percentage of load for the first DC-to-DC converter coupled in parallel to the second DC-to-DC converter to the common load;
β is the sharing percentage of load for the second DC-to-DC converter coupled in parallel to the first DC-to-DC converter to the common load; where $$R_{droop2} = \frac{\alpha}{\beta} R_{droop1},$$

where
$R_{droop1}$ is the droop resistance or droop gain of the first DC-to-DC converter coupled in parallel to the second DC-to-DC converter to a common load, and where $R_{droop2}$ is the droop resistance or droop gain of the second DC-to-DC converter coupled in parallel to the first DC-to-DC converter to the common load; and where:
$I_{DAB1}$ is the output current of the first DC-to-DC converter coupled in parallel,
$I_{DAB2}$ is the output current of the second DC-to-DC converter coupled in parallel,
$Z_{out1}$ is the first output impedance of the first DC-to-DC converter,
$Z_{cable1}$ is the first cable coupled between the DC output of the DC-to-DC converter and the load;
$Z_{out2}$ is the second output impedance of the second DC-to-DC converter,
$Z_{cable2}$ is the second cable coupled between the DC output of the DC-to-DC converter and the load;
kp is a first controller constant;
ki is a second controller constant;
s equals jω, where ω is the frequency response for the controller that is aligned with the switching frequency;
$d_1$ is the first measurement noise associated with a first voltage sensor or current sensor, its hardware, or data processing,
$d_2$ is the second measurement noise associated with a first voltage sensor or second current sensor, its hardware, or data processing.

4. A dual-active-bridge converter system comprising:
a first primary converter having a first switched terminal of low-side semiconductor switch coupled to a corresponding second switched terminal of high-side semiconductor switch at a first primary alternating current node, the low-side semiconductor switch having a second switched terminal coupled to one terminal of a first primary direct current bus; the high-side semiconductor switch having a first switched terminal coupled to another terminal of the first primary direct current bus;
a first secondary converter having a first switched terminal of low-side semiconductor switch coupled to a corresponding second switched terminal of high-side semiconductor switch at a first secondary alternating current node, the low-side semiconductor switch having a second switched terminal coupled to one terminal of a first secondary direct current bus; the high-side semiconductor switch having a first switched terminal coupled to another terminal of the first secondary direct current bus;
a first output voltage sensor configured to measure a first observed output voltage the first secondary converter;
a first output current sensor configured to measure a first observed output current of the first secondary converter;
a first transformer coupled between the first primary current node and the first secondary current node to define a first direct-current-to-direct current converter; and
a first electronic controller configured to provide control signals to the control terminals of the semiconductor switches of the first primary converter and the first secondary converter based on a commanded current or target output current; the first electronic controller configured to adjust or increase the output impedance or output resistance at a first secondary direct current (DC) output terminal of the first secondary converter based on a first droop compensation module or a first parallel compensation module responsive to a current error or current difference between the target output current and the observed output current wherein, the first droop compensation module is configured to adjust or decrease the output impedance or output resistance by decreasing a DC output voltage within a lower limit at the first secondary current DC output terminal if the observed output current is greater than the target output current by a threshold current error.

5. A dual-active-bridge converter system comprising:
a first primary converter having a first switched terminal of low-side semiconductor switch coupled to a corresponding second switched terminal of high-side semiconductor switch at a first primary alternating current node, the low-side semiconductor switch having a second switched terminal coupled to one terminal of a first primary direct current bus; the high-side semiconductor switch having a first switched terminal coupled to another terminal of the first primary direct current bus;
a first secondary converter having a first switched terminal of low-side semiconductor switch coupled to a corresponding second switched terminal of high-side semiconductor switch at a first secondary alternating current node, the low-side semiconductor switch having a second switched terminal coupled to one terminal of a first secondary direct current bus; the high-side semiconductor switch having a first switched terminal coupled to another terminal of the first secondary direct current bus;

a first output voltage sensor configured to measure a first observed output voltage the first secondary converter;

a first output current sensor configured to measure a first observed output current of the first secondary converter;

a first transformer coupled between the first primary current node and the first secondary current node to define a first direct-current-to-direct current converter;

a first electronic controller configured to provide control signals to the control terminals of the semiconductor switches of the first primary converter and the first secondary converter based on a commanded current or target output current; the first electronic controller configured to adjust or increase the output impedance or output resistance at a first secondary direct current (DC) output terminal of the first secondary converter based on a first droop compensation module or a first parallel compensation module responsive to a current error or current difference between the target output current and the observed output current wherein:

the first direct-current-to-direct-current converter comprises the first primary converter, the first secondary converter, the first output voltage sensor, the first output current sensor, the first transformer and the first electronic controller, and having first direct current output terminals comprising the first secondary direct current output terminal;

a second direct-current-to-direct-current converter having second direct current output terminals coupled in parallel to the first direct current output terminals at a parallel output node;

wherein the second direct-current-to-direct-current converter comprises:

a second primary converter having a first switched terminal of low-side semiconductor switch coupled to a corresponding second switched terminal of high-side semiconductor switch at a second primary alternating current node, the low-side semiconductor switch having a second switched terminal coupled to one terminal of a second primary direct current bus; the high-side semiconductor switch having a first switched terminal coupled to another terminal of the second primary direct current bus;

a second secondary converter having a first switched terminal of low-side semiconductor switch coupled to a corresponding second switched terminal of high-side semiconductor switch at a second secondary alternating current node, the low-side semiconductor switch having a second switched terminal coupled to one terminal of a second secondary direct current bus; the high-side semiconductor switch having a first switched terminal coupled to another terminal of the second secondary direct current bus;

a second output voltage sensor configured to measure a second observed output voltage the second secondary converter;

a second output current sensor configured to measure a second observed output current of the second secondary converter;

a second transformer coupled between the second primary alternating current node and the second secondary alternating current node;

a second electronic controller configured to provide control signals to the control terminals of the semiconductor switches of the second primary converter and the second secondary converter based on a commanded current or target output current; the second electronic controller configured to adjust or increase the output impedance or output resistance at a second secondary DC output terminal of the second secondary converter based on a second droop compensation module or a second parallel compensation module responsive to a second current error or current difference between the target output current and the observed output current, the second current error observable at the second direct-current-to-direct current converter wherein, each of the first and second droop compensation modules or the parallel compensation modules are configured to observe the respective first and second target output currents at the parallel output node and to generate a first compensating voltage, a second compensating voltage, or both for one or more successive time intervals to attenuate the circulating current during transient changes in the load;

a first communications device coupled to the first electronic controller; and a second communications device coupled to the second electronic controller;

the first communications device and the second communications device configured to support a communications channel via a transmission line or wireless communications channel to coordinate the first compensating voltage and the second compensating voltage, or both for one or more successive time intervals to attenuate the circulating current during transient changes in the load.

6. The dual active bridge system according to claim 5 wherein the first communications device and the second communications device comprise transceivers configured to communicate over at digital rate of less than or equal to 10,000 Kilobits per second.

7. The dual active bridge system according to claim 5 wherein in a current command mode, which is distinct from a droop control mode, the first and second communications devices facilitate communications between or among the parallel compensation modules of the DC-to-DC converters to adjust the commanded currents of one or more both DC-to-DC converters to equalize the output currents at the output node or to eliminate power sharing mismatch among or between the DC-to-DC converters at the parallel output node.

* * * * *